United States Patent [19]
Matsuoka et al.

[11] Patent Number: 5,490,129
[45] Date of Patent: Feb. 6, 1996

[54] OPTICAL HEAD AND OPTICAL INFORMATION READING APPARATUS

[75] Inventors: Kazuhiko Matsuoka; Seiichiro Satomura; Katuya Yamazaki, all of Yokohama; Takeshi Yamawaki, Tokyo, all of Japan

[73] Assignee: Canon Kabushiki Kaisha, Tokyo, Japan

[21] Appl. No.: 82,303

[22] Filed: Jun. 28, 1993

[30] Foreign Application Priority Data

Jun. 29, 1992 [JP] Japan .................................. 4-192804

[51] Int. Cl.$^6$ ........................................ G11B 7/26
[52] U.S. Cl. ............................... 369/120; 369/124
[58] Field of Search .................. 369/44.41, 44.42, 369/120, 124

[56] References Cited

U.S. PATENT DOCUMENTS

| | | | |
|---|---|---|---|
| 4,866,689 | 9/1989 | Satokata | 369/44.41 |
| 5,015,835 | 5/1991 | Ohuchida et al. | 250/201.5 |
| 5,073,888 | 12/1991 | Takahashi et al. | 369/112 |
| 5,258,970 | 11/1990 | Kobayashi | 369/44.42 |

FOREIGN PATENT DOCUMENTS

| | | |
|---|---|---|
| 0311340 | 4/1989 | European Pat. Off. . |
| 0311463 | 4/1989 | European Pat. Off. . |
| 0379363 | 7/1990 | European Pat. Off. . |
| 0402123 | 12/1990 | European Pat. Off. . |
| 0447265 | 9/1991 | European Pat. Off. . |
| 0468800 | 1/1992 | European Pat. Off. . |
| 0469580 | 2/1992 | European Pat. Off. . |
| 0478163 | 4/1992 | European Pat. Off. . |
| 0515219 | 11/1992 | European Pat. Off. . |
| 0563484 | 10/1993 | European Pat. Off. . |
| 3-73448 | 3/1991 | Japan . |

OTHER PUBLICATIONS

"Write Verify System for Field Modulation Optical Recording", Research Disclosure, No. 320, Dec. 1990, Havant GB, p. 963, XP000163362.

*Primary Examiner*—Davis L. Willis
*Assistant Examiner*—Don Wong
*Attorney, Agent, or Firm*—Fitzpatrick, Cella, Harper & Scinto

[57] ABSTRACT

An optical head is used in a magnetic field modulation type magnetooptical recording/reproducing apparatus. The optical head includes a device for irradiating a magnetooptical record medium with a light beam, a separating device for separating a reflected light beam from the magnetooptical record medium into two beams to be projected onto a single plane, a single photodetector provided with two two-divided light receiving portions for respectively receiving the two beams, and a single convex lens element for forming images of the two beams as light spots on the single photodetector.

4 Claims, 28 Drawing Sheets

OPTICAL HEAD AND OPTICAL INFORMATION READING APPARATUS

BACKGROUND OF THE INVENTION

1. Field of the Invention

The present invention relates to an optical head used in magnetooptical memory system utilizing the magnetooptical effect to record and/or reproduce information in a magnetooptical record medium, and to an optical information reading apparatus for reproducing information in optical information record medium with reflected light of a light spot irradiating the medium.

2. Related Background Art

Recently active with the spread of computer is the development of a magnetooptical memory system capable of erasing or rewriting information as a large capacity external memory. Information may be recorded in a magnetooptical record medium by utilizing a local temperature rise in a magnetic thin film with irradiation of laser beam spot and reproduced by the magnetooptical effect, especially by the Kerr effect.

The conventional apparatus had a disadvantage of slow record time because of necessity of three operations in the information record process, i.e., erasure of already recorded or old information, record of new information, and verification of whether the new information is correctly recorded.

This problem may be dealt with for example by using the technique as described in Japanese Laid-open Patent Application No. 3-73448. The structure and function of the optical head as described in the above patent application is described below with FIG. 1.

In FIG. 1, a magnetooptical record medium 101 is driven to rotate in a certain direction while held on a turn table 102.

A laser beam emitted from a laser source 103 is collimated by a collimating lens 104, then passes through a beam splitter 105, and is converged by an objective lens 106 onto the magnetooptical record medium 101.

Magnetic field generating means 107 is disposed opposing to the laser beam irradiating portion on the back side of the magnetooptical record medium 101. The magnetic field generating means 107 generates a magnetic field changing depending upon information to be recorded, that is, an information-modulated magnetic field. The information-modulated magnetic field is applied to the laser beam irradiating portion on the magnetooptical record medium to effect the information record in the magnetooptical record medium 101.

The erasure operation of old information in a sector into which new information is to be written is carried out at the same time with the record operation. Namely, it is the magnetic field modulation type overwriting technique.

While the above overwriting operation is carried out, reflected light from the magnetooptical record medium 101 again passes through the objective lens 106, is then reflected by the beam splitter 105, passes through a half-wave plate 108, and thereafter is separated into two beams by a polarizing beam splitter 109.

One of the separated beams passes through a convex lens 111 and a cylindrical lens 112, and is received by a four-divided (4D) photodetector 113. The autofocus and autotracking operations are carried out based on calculation results with outputs from the 4D photodetector 113.

The other of the separated beams is converged by a convex lens 110 and is received by a photodetector 114. A magnetooptical signal may be detected from a differential output between a total output of the 4D photodetector 113 and an output of the photodetector 114. Namely, it is the direct verification technique. Accordingly, together with the overwriting technique, a one-pass writing operation is executed to simultaneously effect the erasure, the recording, and the verification.

FIG. 2 shows a state of a light spot on the magnetooptical record medium 101, in which the recording is carried out in the magnetic field modulation method and a state of magnetization in the magnetooptical record medium 101 in information record. The arrow in FIG. 2 represents a direction of relative movement of light spot to the magnetooptical record medium 101, and the right end circle represents a light spot. The right half area hatched in the light spot in FIG. 2 is a low-temperature region still insufficient in heating, which would be a region in which the inversion of magnetic field could be unstable in some record media.

The direct verification operation might not be carried out well by some chance in such record media. The detection system as shown in FIG. 3 is disclosed to overcome it.

In the conventional apparatus shown in FIG. 3, each of two photodetectors 131, 132 receives a reflected light beam from the magnetooptical record medium to generate a magnetooptical signal, which are two-divided (2D) photodetectors. In more detail, each photodetector 131, 132 has a photodetector segment 131a, 132a receiving a reflected light beam from the hatched region (see FIG. 2) insufficient in heating in the reflected light from the magnetooptical record medium, and a photodetector segment 131b, 132b receiving a reflected light beam from the region sufficient in heating in the reflected light. A reproduction magnetooptical signal $(S_6+S_7)-(S_8+S_9)$ and a verification magnetooptical signal $(S_8-S_7)$ are obtained based on respective outputs $S_6$, $S_9$, $S_7$, $S_8$ from the above photodetector segments 131a, 132a, 131b, and 132b.

FIG. 4 shows another example of light spot, illustrating a state of a light spot on the magnetooptical record medium 101, in which the recording is carried out in the magnetic field modulation method, and a magnetization state in the magnetooptical record medium 101 in information record.

The arrow in FIG. 4 represents a direction of relative movement of light spot to the magnetooptical record medium 101, and the right end circle represents a light spot. A crescent area hatched in the light spot is a low-temperature region still insufficient in heating, which would be a region in which the inversion of magnetic field could be unstable in some record media. The aforementioned direct verification operation might not be carried out well by some chance in such record media. The detection system shown in FIG. 5 is disclosed to overcome it.

In the conventional apparatus shown in FIG. 5, each of two photodetectors 131, 132 receives a reflected light beam from the magnetooptical record medium to generate a magnetooptical signal, which are 2D photodetectors. In more detail, each photodetector 131, 132 has a photodetector segment 131a, 132a receiving a reflected light beam from the hatched low-temperature region (see FIG. 5) insufficient in heating in the reflected light from the magnetooptical record medium, and a photodetector segment 131b, 132b receiving a reflected light beam from a high-temperature region sufficient in heating. A reproduction magnetooptical signal $(S_6+S_7)-(S_8+S_9)$ and a verification magnetooptical signal $(S_8-S_7)$ are obtained based on respective outputs $S_6$, $S_9$, $S_7$, $S_8$ from the photodetector segments 131a, 132a, 131b, and 132b.

Conventionally, the reading resolving power of an apparatus for optically reading information was determined by an optical spot size. The optical spot size is in proportion to the wavelength of light as well as to the inverse of angular aperture of condenser lens. A reduction in wavelength of light is restricted by structural issues of light source, for example of a semiconductor laser, while an increase in angular aperture of condenser lens has a designing limit.

In order to obtain a signal of smaller area than the optical spot, it is conceivable that the photosensor is divided into plural segments.

FIG. 6 shows a constitutional example of a conventional optical information reading apparatus. A laser beam emitted from a semiconductor laser 601 passes through a lens 602, a beam splitter 603 and a lens 604, and is condensed at the point of 605 to irradiate a record medium 606. Light reflected from the medium 606 passes through the lens 604, the beam splitter 603 and a lens 607 to irradiate a sensor 608. The sensor 608 is divided into two segments 608a and 608b.

Now described with FIG. 7 is a relation between the spot 605 and an image on the sensor 608 in this arrangement. FIG. 7 is simplified by omitting the parallel beam portion between the lens 604 and the lens 607 in FIG. 6. In FIG. 7, if a lens 610 with focal length f is placed to a spot 609, an image of the spot 609 is formed at a point 611, macroscopically satisfying the relation, $(1/a)+(1/b)=1/f$, and the image of spot 609 may be projected onto a sensor 611 placed there. Thus, light from segment 609a reaches a region 611a while light from a segment 609b reaches a region 611b. Therefore, returning to FIG. 6, information in the region 605a on the record medium 606 must reach the sensor segment 608b while information in the region 605b the sensor segment 608a.

Actually, as the spot becomes smaller, the border line becomes unclear between the regions 605a and 605b projected onto the sensor 608 due to the aberrations of lens and the diffraction of light wave. Since the image projected onto the sensor 608 decreases with smaller spot, it becomes difficult to make the border between the regions 605a and 605b in the image coincident with the border between the sensor segments 608a and 608b. Further, the image might be buried in the insensitive zone between the sensor segments 608a and 608b.

Then, the sensor 608 in FIG. 6 is actually arranged as to be deviated from the image-formed position. If the sensor 608 is deviated before the image-formed position, the image is blurred, but more reflected light from the region 605a on the spot enters the sensor segment 608a and more reflected light from the region 605b enters the sensor segment 608b because of the diffraction. However, their separation would be insufficient.

In the above-described conventional examples, however, a drawback is an increase in size of optical head, because a convex lens 110 and a photodetector 131, 132 comprised of two segments must be provided for each beam separated by the polarizing beam splitter 109, specifically as shown in FIG. 3.

Another disadvantage is an increase in production cost due to the increased number of components. Further, the photodetectors 131, 132 must be aligned with the respective beams independently of each other, resulting in spending a lot of time for position alignment.

SUMMARY OF THE INVENTION

The present invention has been accomplished, taking into account the disadvantages in the conventional examples as described above.

It is an object of the present invention to provide an optical head with one-pass writing function, which can readily achieve a size reduction, a weight reduction and a thickness reduction.

It is a further object of the present invention to provide an optical head with stable direct verification function.

It is a further object of the present invention to provide an optical head reduced in the number of components to enable the cost reduction.

It is a further object of the present invention to provide an optical head easy in assembly adjustment.

In the conventional examples as described above, especially as shown in FIG. 3, the photodetectors 131, 132 must be aligned with the respective beams if they are 2D sensors. A spot diameter on RF sensor is normally about 100 μm or less, and therefore microadjustment is necessary for evenly dividing a light quantity of the spot into two for the 2D sensor. Accordingly, the microadjustment of RF sensor, which is used to be unnecessary, is added to the assembly adjustment, which requires a lot of time and work.

Also, in the conventional examples as described above, for example even in case of use of the 2D sensors as shown in FIG. 5, a verification signal obtained from the photodetector 131b, 132b unavoidably includes a part of information in the low-temperature region shown by hatching. The signal components from the low-temperature region become a factor of noises in verification signal, making the detection of verification signal difficult.

Also, in order to obtain a signal of reflected light from the region 605a in light spot on the record medium in FIG. 6, it is effective to use the 2D sensor such as the sensor 608 and to use a signal detected by the segment 608a in the sensor. There is, however, a problem that the signal of the sensor segment 608a includes a signal of reflected light from the region 605b in the light spot.

It is another object of the present invention extract pure signal components of reflected light only from the region 605a under the above circumstances.

The objects of the present invention can be achieved by an optical head in a magnetic field modulation type magnetooptical recording/reproducing apparatus, which comprises means for dividing reflected light from a magnetooptical record medium into two beams and two two-divided (2D) light receiving portions in correspondence with the two beams, in which a reproduction signal is obtained by calculation of all outputs from the two 2D light receiving portions and a direct verification signal is obtained by calculation of two outputs each from a half segment of each 2D light receiving portion, and in which the two 2D light receiving portions are formed on a single light receiving element.

The objects of the present invention can be also achieved by an optical head used in a magnetic field modulation type magnetooptical recording/reproducing apparatus, which comprises means for dividing reflected light from a magnetooptical record medium into two beams, a convex lens element and a light receiving element, in which two 2D light receiving portions are provided on the light receiving element, in which the 2D light receiving portions respectively receive the two beams, and in which the light receiving element is located at a position apart by a distance δf from a focus position on an optical axis of the convex lens element.

Further, the objects of the present invention can be achieved by an optical head for a magnetic field modulation type magnetooptical recording/reproducing apparatus, which comprises means for separating reflected light from a magnetooptical record medium in information record into two beams on a plane including the radial direction perpendicular to the track direction, and a light receiving element, in which two sets of 2D light receiving portions are provided in the light receiving element, and in which dividing lines in the 2D light receiving portions reside in said perpendicular plane.

Further, the objects of the present invention can be achieved by an optical head for a magnetic field modulation type magnetooptical recording/reproducing apparatus, which comprises means for dividing reflected light from a magnetooptical record medium in information record into two beams on a plane including the track direction, and a light receiving element, in which two sets of 2D light receiving portions are provided in the light receiving element, and in which dividing lines of the 2D light receiving portions are not paralell to each other.

Also, the present invention, solving the problems in the above conventional examples, involves an optical head for a magnetic field modulation type magnetooptical recording/reproducing apparatus, which comprises means for dividing reflected light from a magnetooptical record medium in information record into two beams on a plane including the track direction, and two four-divided (4D) light receiving portions provided on a single light receiving element to respectively receive the two beams, and in which the 4D light receiving portions are symmetric each with respect to the center of beam and juxtaposed in the track direction.

In the above arrangement two inside light receiving segments in each 4D light receiving portion may be located asymmetric with respect to each center of beam, whereby the SN ratio of verification signal may be improved while solving the problems in the above conventional examples.

Also, the present invention, solving the problems in the above conventional examples, involves an optical head for a magnetic field modulation type magnetooptical recording/reproducing apparatus, which comprises means for dividing reflected light from a magnetooptical record medium in information record into two beams and two 2D light receiving portions provided on a single light receiving element to respectively receive the two beams, in which a gain adjusting mechanism is provided for each output of the 2D light receiving portions, and in which a verification signal is detected by obtaining a differential output between a differential signal from the first 2D light receiving portion and a differential signal from the second 2D light receiving portion.

Also, the present invention, solving the problems in the above conventional examples, involves an optical head for a magnetic field modulation type magnetooptical recording/reproducing apparatus, which comprises means for dividing reflected light from a magnetooptical record medium in information record into two beams, and two 2D light receiving portions provided on a single light receiving element to respectively receive the two beams, and in which the 2D light receiving portion are asymmetric each with respect to the center of beam and juxtaposed in the track direction.

The objects of the present invention can be also achieved by such an arrangement that there are provided means for reading information recorded on a record medium with an optical spot irradiating it, a light sensor divided into m regions for reading reflected light, and an optical system arranged such that if the optical spot is divided into n regions, if components of light quantity of reflected light from the respective n regions are expressed by a vector $P_n=(p_1, p_2, \ldots, p_n)$, and further if components of light quantity of input light into the m regions in the light sensor are expressed by a vector $Q_m=(q_1, q_2, \ldots, q_m)$, then a mapping $\phi: P_n \to Q_m$, which is a mapping from a vector space $P_n$ to a vector space $Q_m$, is preliminarily known, in which an inverse $\phi^{-1}(Q_m)$ is calculated with the vector $Q_m$ of output signals from the plural regions in the sensor and in which a light quantity of reflected light from a specific region $p_x$ on the optical spot is calculated to read information recorded in the specific region $p_x$.

For example, the light quantities $p_1$, $p_2$ reflected from the spots 605a, 605b in FIG. 6 are expressed by a vector $P=(p_1, p_2)$; light quantities $q_1$, $q_2$ input into the sensor segments 608a, 608b are expressed by a vector $Q=(q_1, q_2)$; the characteristics of the optical system therebetween are defined by a mapping $\phi: P_2 \to Q_2$, which is a mapping from a vector space $P_2$ to a vector space $Q_2$; and an inverse $\phi^{-1}(Q_2)$ is calculated to obtain P.

DETAILED DESCRIPTION OF THE PREFERRED EMBODIMENTS

Figure 8:
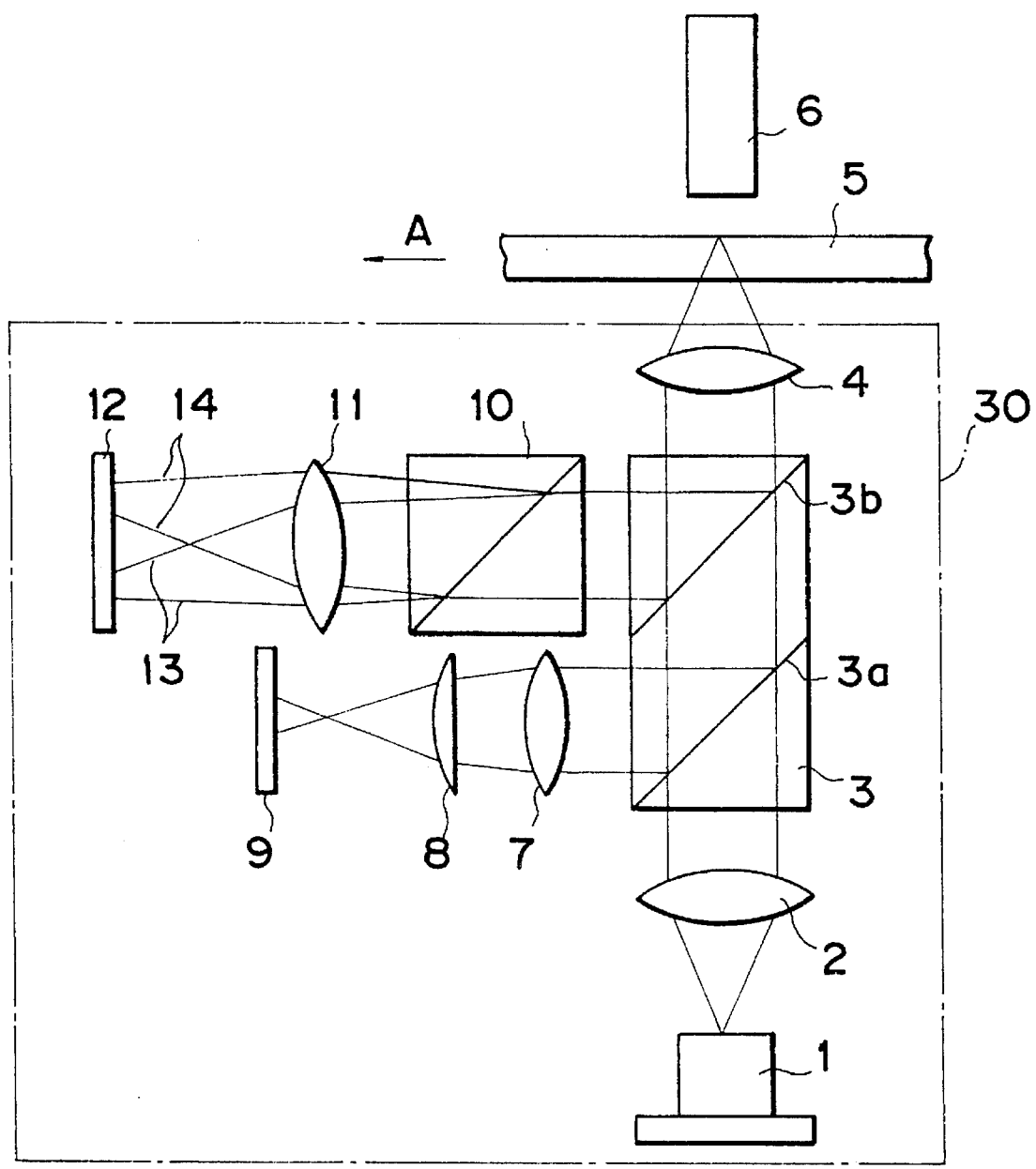
FIG. 8 is a schematic drawing to show the structure of an optical head in an embodiment according to the present invention.

Embodiments of the present invention will be described in detail with reference to the accompanying drawings. FIG. 8 schematically shows the structure of an optical head 30 according to the present invention. Light from a semiconductor laser 1 passes through a collimating lens 2, a compound prism 3 and an objective lens 4 to be then condensed onto a magnetooptical record medium 5. A part of light reflected from the magnetooptical record medium 5 is led out from a joint plane 3a of the compound prism 3, and passes through a convex lens 7 and a cylindrical lens 8 to reach a servo sensor 9. The autofocus and autotracking controls are carried out based on an output from the servo sensor 9.

Also, light led out from a joint plane 3b of the compound prism 3 enters a Wollaston polarizing prism 10. Passing through the Wollaston prism 10, the light is further separated into two beams 13, 14, which are linearly polarized light components perpendicular to each other. The thus separated two beams 13, 14 are condensed by a convex lens 11 onto an RF sensor (photodetector) 12. The light from the semiconductor laser 1 is linearly polarized light comprised of polarized components vibrating in the sheet plane of FIG. 8. The Wollaston prism 10 is comprised of two quartz prisms joint with each other such that optical axes of the two quartz prisms are in a reference plane perpendicular to the collimated light led out from the joint plane 3b and are perpendicular to each other, and that either one of the axes is inclined at an angle of 45° to the sheet plane of FIG. 8.

Accordingly, supposing the beam 13 is in the reference plane and linearly polarized light vibrating in the direction inclined at 45° to the sheet plane, the beam 14 is linearly polarized light vibrating in the direction inclined at 135° to the sheet plane. In FIG. 8 the magnetooptical record medium 5 moves relative to the objective lens 4 in the direction of arrow A in the sheet plane. In other words, the two beams 13, 14 reside in the plane including the track direction (arrow A), that is, in the sheet plane. The information record is carried out with modulated magnetic field generating device 6 for generating a magnetic field changed according to information to be recorded.

Figure 9:
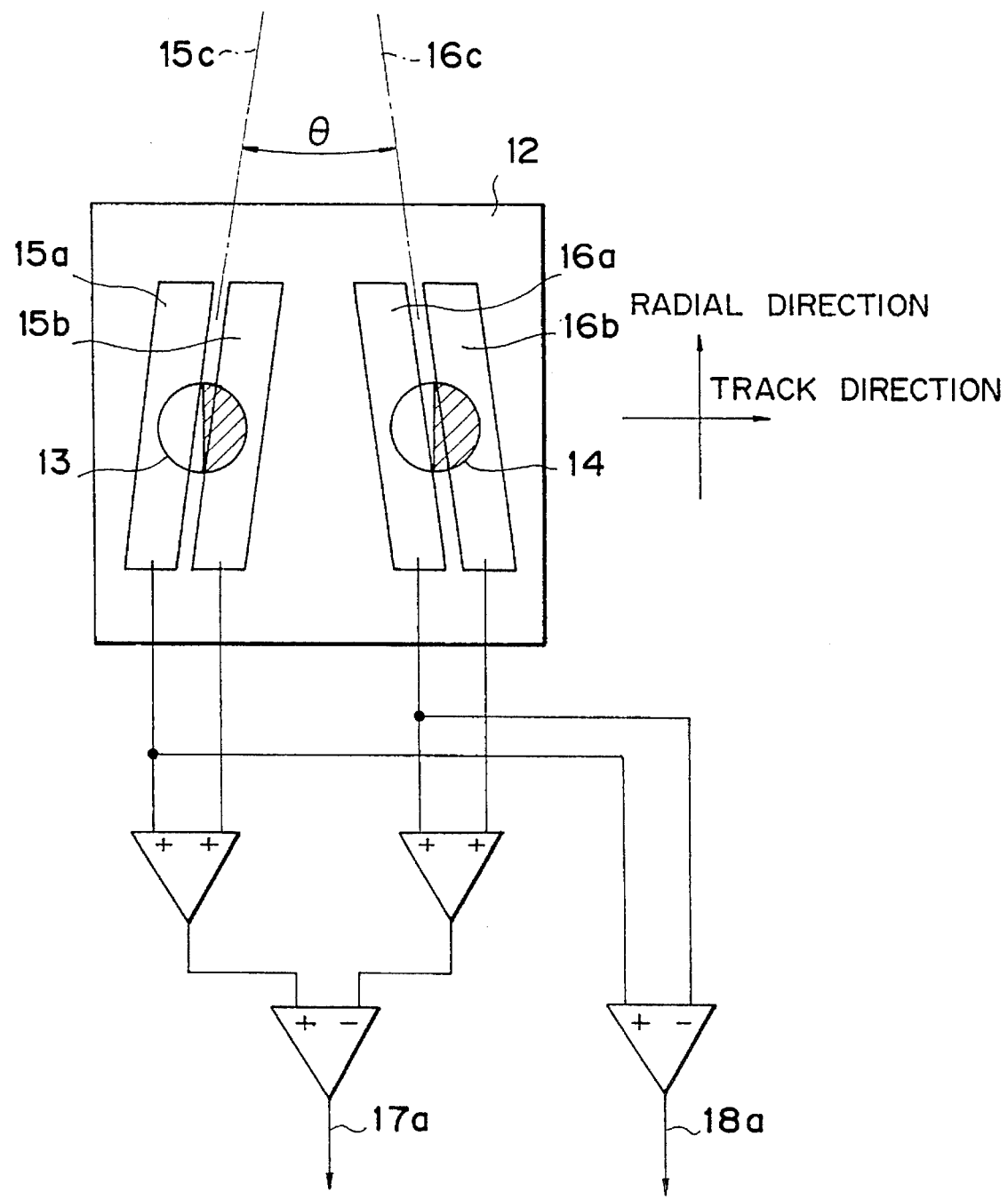
FIG. 9 is a drawing to illustrate a photodetector in an embodiment according to the present invention.

FIG. 9 schematically shows a relation between a light receiving area in the RF sensor (photodetector) 12 and light spots. There are provided on the RF sensor 12, a first two-divided (2D) light receiving portion 15 comprised of two light receiving segments 15a, 15b separated by a dividing line 15c and a second 2D light receiving portion 16 comprised of two light receiving segments 16a, 16b similarly separated by a dividing line 16c. The two beams 13 and 14, which are comprised of linearly polarized light components perpendicular to each other as described with FIG. 8, are condensed such that a centroid of light quantity is located on the dividing line 15c, 16c.

A normal reproduction signal 17a is obtained as a differential output between a sum of outputs from the light receiving segments 15a, 15b and a sum of outputs from the light receiving segments 16a, 16b.

A direct verification signal 18a is obtained as a differential output between the output from the light receiving segment 15a and the output from the light receiving segment 16a.

It is preferable for reproduction of pit position record signal that there are provided with the means for obtaining a reproduction signal by the calculation with all outputs from the two 2D light receiving portions and with the means for obtaining the direct verification signal by the calculation with the outputs each from one of the segments in each 2D light receiving portion, as described above.

Figure 1:
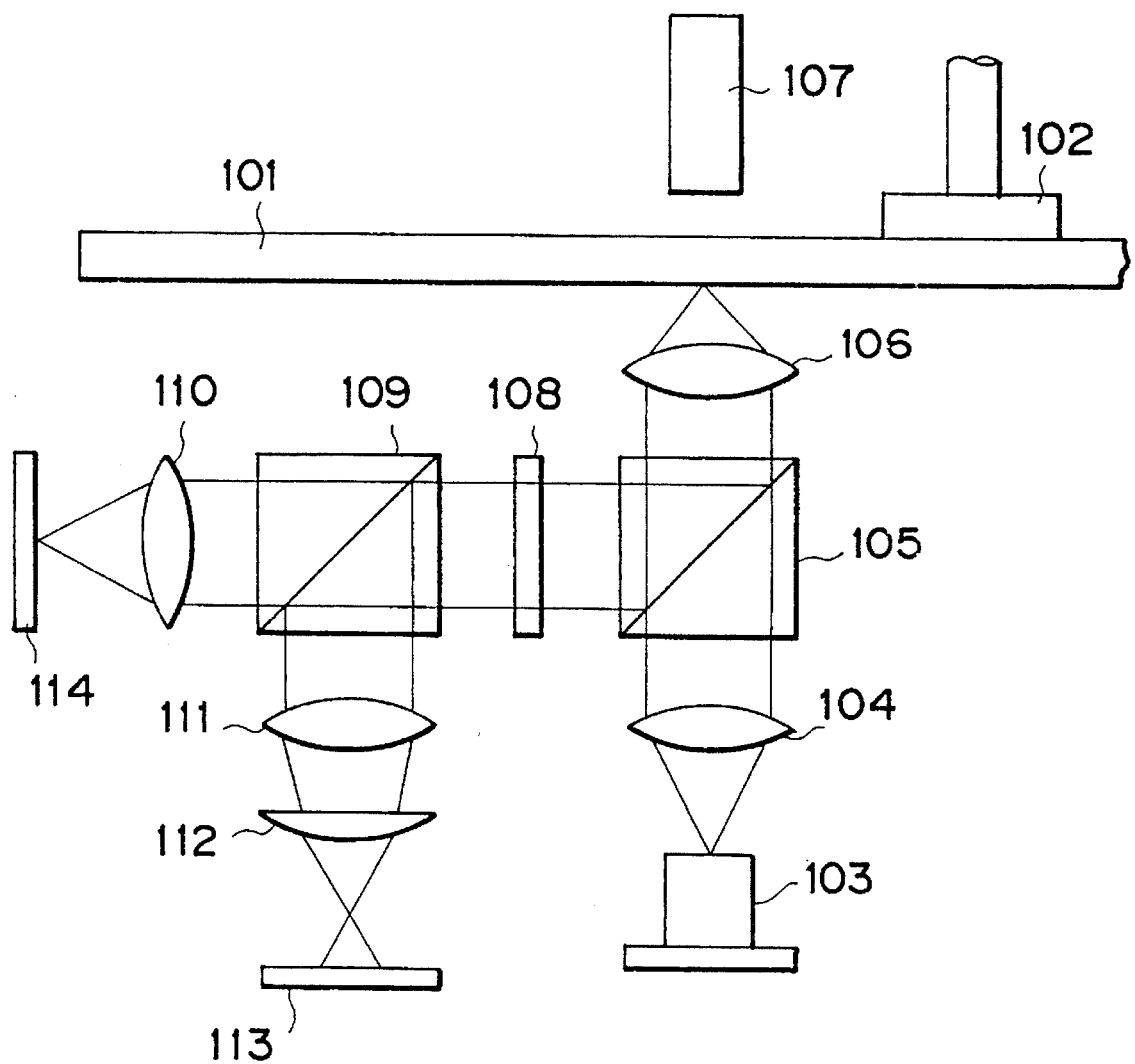
FIG. 1 is a schematic constitutional drawing to show an optical head as a conventional example.
Figure 2:
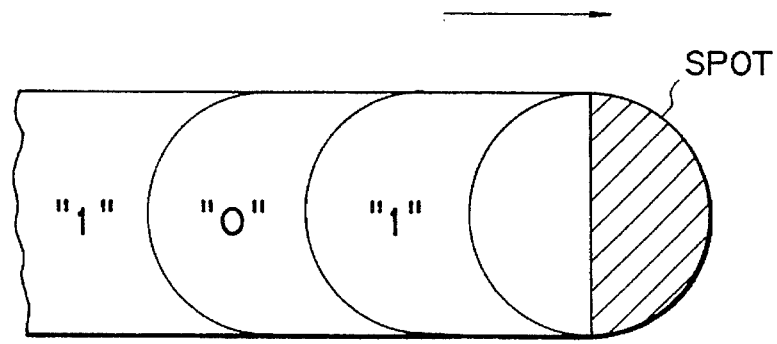
FIG. 2 is a drawing to show a light spot and a record state on a record medium.

The optical head according to the present invention as described with FIG. 8 is so arranged that the two 2D light receiving portions are formed in the single photodetector, i.e., the RF sensor and that the single convex lens 11 is disposed behind the Wollaston prism 10 as the two beam dividing means to condense the separated two beams onto the RF sensor. Such an arrangement can omit a convex lens and a sensor as compared with the optical head in the conventional examples as described with FIG. 1 to FIG. 3. Although not shown, a mechanism for holding a convex lens and a sensor may be also obviated.

Figure 3:
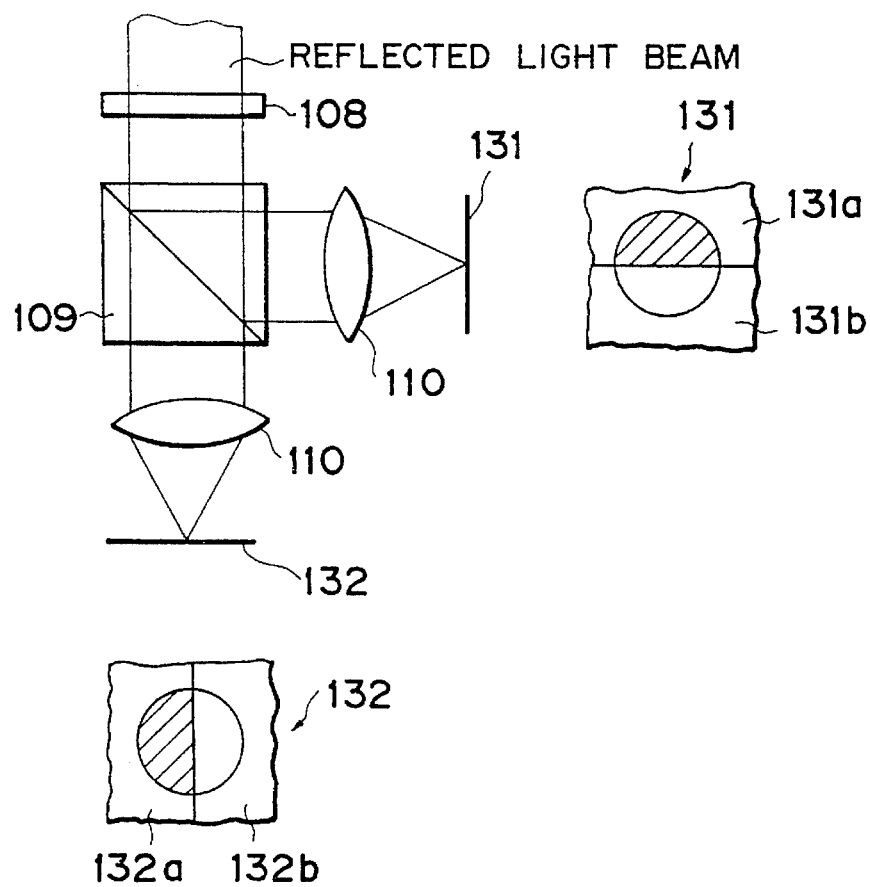
FIG. 3 is a drawing to illustrate a state of light spots on sensors.
Figure 4:
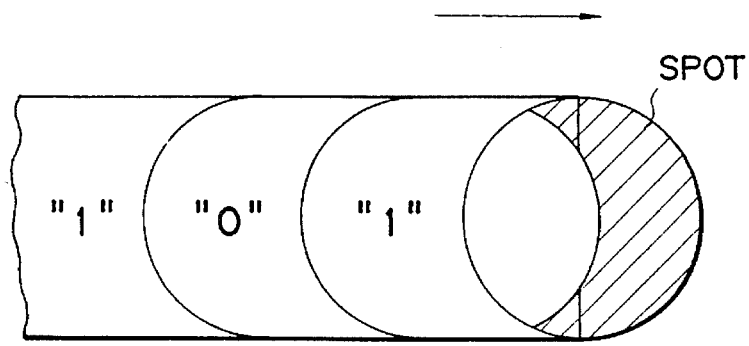
FIG. 4 is a drawing to show a light spot and a record state on a record medium in a conventional example.
Figure 5:
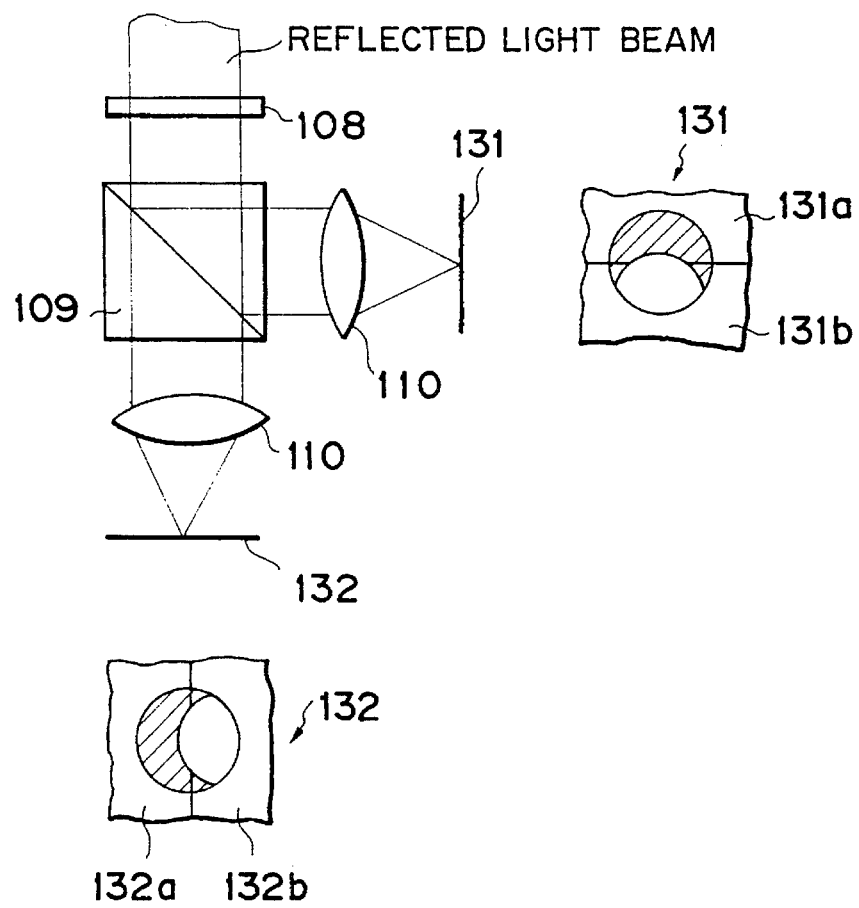
FIG. 5 is a drawing to illustrate a state of light spots on sensors in a conventional example.
Figure 6:
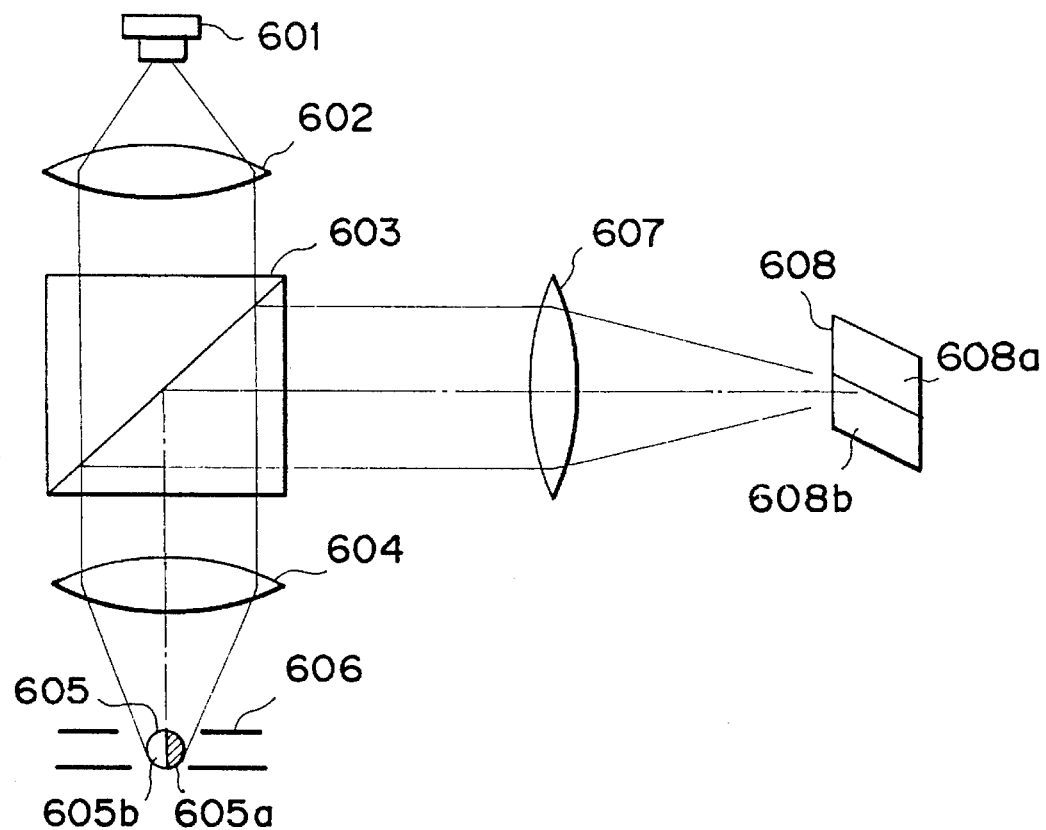
FIG. 6 is a constitutional drawing to show a conventional information reproducing apparatus generally used.
Figure 7:
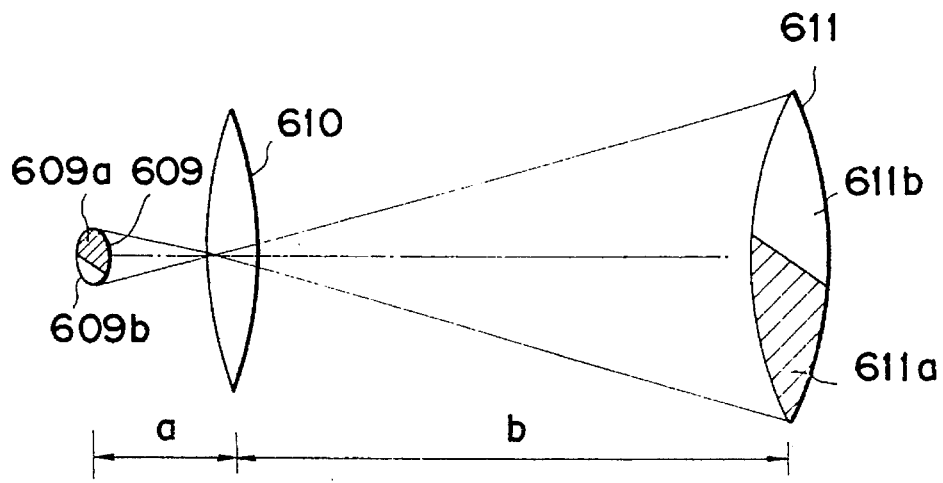
FIG. 7 is a drawing to illustrate a relation between a spot and an image on a sensor.

Moreover, the optical path is not divided as shown in the conventional example in FIG. 3, so that the optical head may be reduced in size, in weight and in thickness, which enables high-speed seeking.

In the arrangement of FIG. 8 the Wollaston prism 10 and the convex lens 11 may be exchanged in position along the optical axis.

A preferable magnetooptical record medium used with the optical head according to the present invention is for example one of exchange-coupling-type double-layered film structure. The principle and the structure thereof will be briefly described below.

Figure 10:
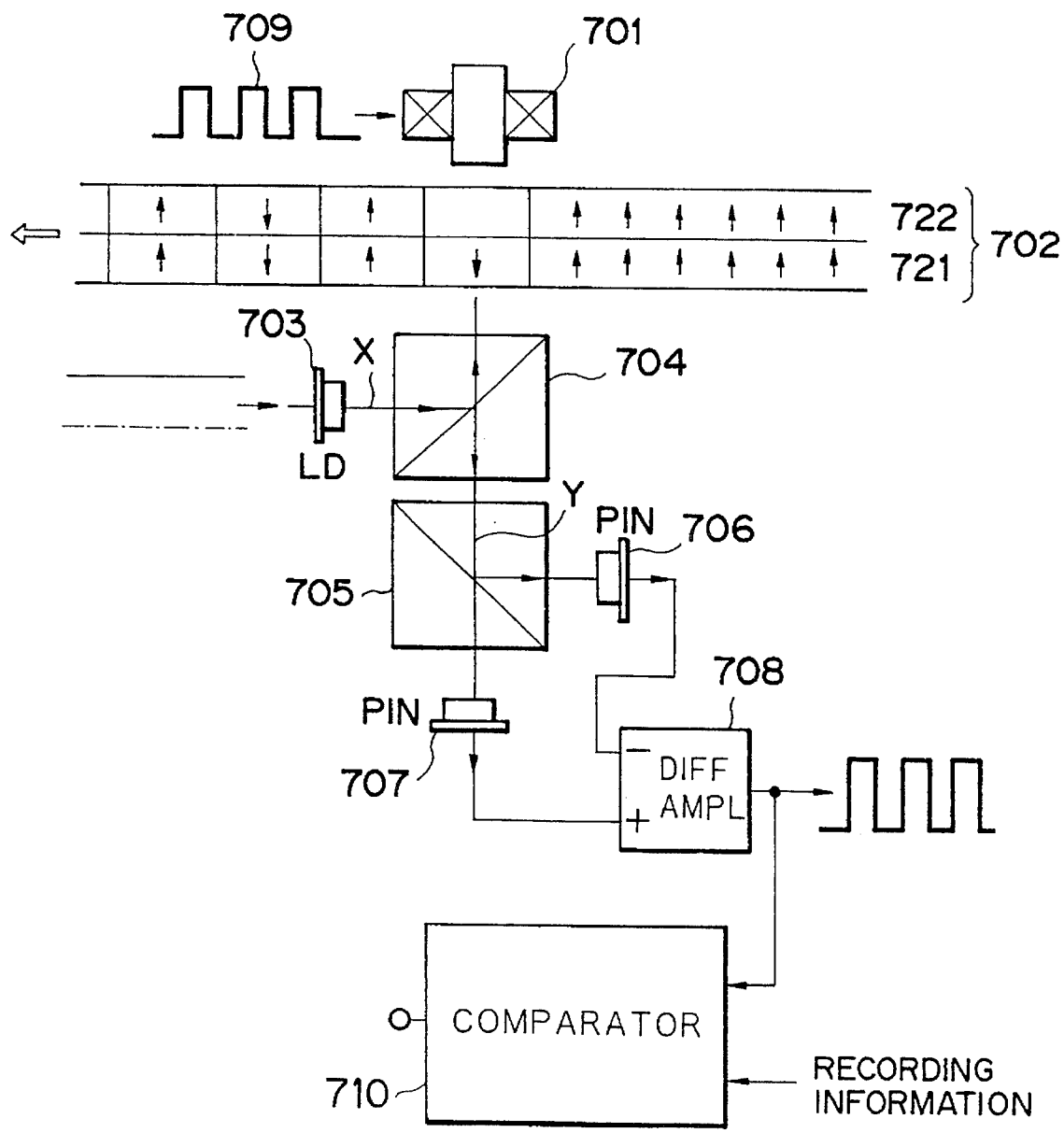
FIG. 10 is a schematic constitutional drawing to show an optical head using a record medium of exchange-coupling-type double-layered film structure.

FIG. 10 is a schematic drawing to show an example of magnetooptical record method using a record medium of exchange-coupling-type double-layered film structure. In FIG. 10, reference numeral 701 denotes a coil for applying an external magnetic field onto the record medium. The magnetic field is modulated according to record information by an unrepresented modulation circuit. Further, numeral 702 designates a record medium, 721, a first magnetic layer having a low coercive force and a high Curie temperature at a room temperature, 722 a second magnetic layer having a higher coercive force and a lower Curie temperature than the first magnetic layer, which can be exchange-coupled with the first magnetic layer, 703 a semiconductor laser, 704 a half prism, 705 a polarizing beam splitter, 706 and 707 photodiodes (PIN photodiodes), 708 a differential amplifier, and 710 a comparator for comparing reproduced information from the record medium with information to be recorded therein for verification.

The operational principle of the present invention will be described below.

When a laser beam X with a constant intensity (which is preliminarily set to a level to raise the temperature of the second magnetic layer up to a temperature proximate to the Curie temperature thereof when it irradiates the record medium 702, taking the rotation speed of the record medium 702 into consideration) irradiates the record medium 702 rotated by an unrepresented spindle motor, the temperature rises in the portion of record medium irradiated by the laser beam X to cause the magnetization in the second magnetic layer 722 with the lower Curie temperature to disappear. In contrast, since the first magnetic layer 721 has the higher Curie temperature than the second magnetic layer 722, the magnetization in the first magnetic layer 721 remains as it is. Once the magnetization in the second magnetic layer disappears, no exchange coupling works between the first magnetic layer and the second magnetic layer to render the first magnetic layer having a smaller coercive force natural without the exchange coupling. (An apparent coercive force in the first magnetic layer becomes greater with the exchange coupling.) If the external magnetic field is applied to the record medium in that state by the coil 701 with the magnetic field modulated in direction according to the record information, the magnetization in the first magnetic layer is aligned in the direction of applied magnetic field to effect the information record.

The direction of magnetization in the first magnetic layer is detected in real time by the photodiodes 706, 707 as a change in magnetooptical effect (Kerr effect or Faraday effect) of reflected light Y of the laser beam X irradiating the record medium 702. Specifically, the laser beam X irradiating the magnetic-field-applied position by the coil 701 is reflected by the record medium 702, and the reflected beam passes through the half prism 704 and the polarizing beam splitter 705 to enter the photodiodes 706, 707. Outputs from the photodiodes 706, 707 are input into the differential amplifier 708, which takes a difference therebetween and amplifies the difference to output a reproduction signal. The reproduction signal is compared with the record information in the comparator 710. If the reproduction signal is not coincident with the record information, the serial record information is re-recorded in the same location or in another location. If the reproduction signal is coincident with the record information, the re-recording is not carried out. The re-recording may be carried out either after the record of serial information is finished or immediately after noncorrespondence is detected between the reproduction signal and the record information. The record result may be thus checked with an abnormal reproduction signal given if correct record is not performed due to a defect, deterioration, corrosion, or dust on the record medium.

A record medium capable of carrying out the present embodiment must have at least the first magnetic layer having a low coercive force and a high Curie temperature at a room temperature and the second magnetic layer having a higher coercive force and a lower Curie temperature than the first magnetic layer, in which the first magnetic layer must be exchange-coupled with the second magnetic layer. The record medium of the present invention may be formed in a variety of structures. For example, a record medium may have the structure in which a transparent substrate into which the laser beam is incident, a first dielectric layer, a first magnetic layer, a second magnetic layer and a second dielectric layer are built up. More specifically, the record medium may be constructed as follows: first dielectric layer SiN (refractive index:2.25; film thickness:516 Å)/first magnetic layer Gd-Fe-Co-Cr (Fe-Co sublattice magnetization superiority; saturation magnetization: 100 emu/cm$^3$; film thickness:400 Å)/second magnetic layer Tb-Fe-Co-Cr (Fe-Co sublattice magnetization superiority; saturation magnetization:100 emu/cm$^3$; film thickness:400 Å)/second dielectric layer SiN (refractive index:2.25; film thickness:700 Å).

Figure 11:
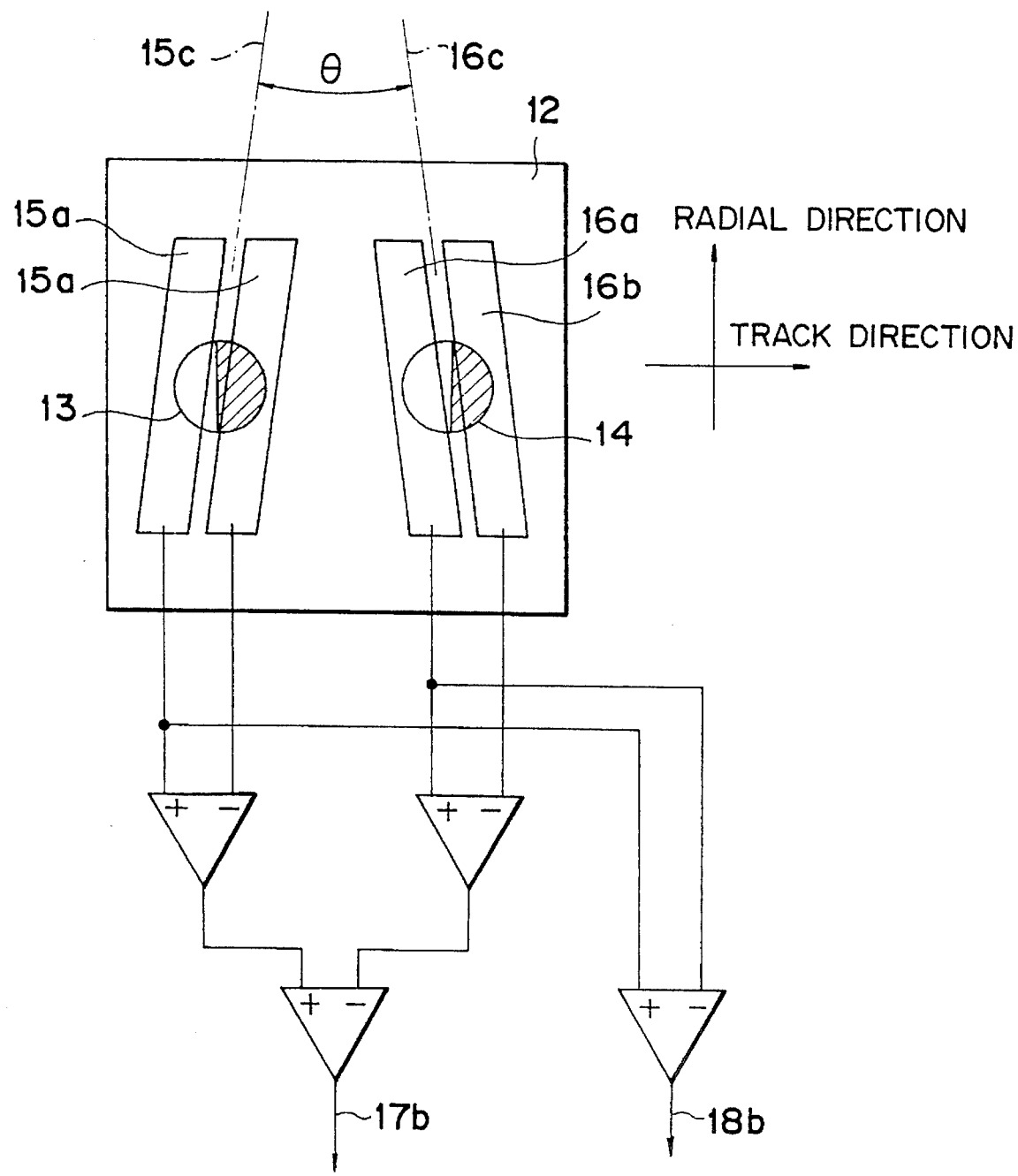
FIG. 11 is a drawing to illustrate a further embodiment according to the present invention.

FIG. 11 shows a further embodiment of detection method of reproduction signal. In FIG. 11, a normal reproduction signal 17b is obtained as a differential output between a differential output between an output from a light receiving segment 15a and an output from a light receiving segment 15b, and a differential output between an output from a light receiving segment 16a and an output from a light receiving segment 16b. The present embodiment is suitable for reproduction of pit edge record signal. A direct verification signal 18b is obtained in the same manner as in the description with FIG. 9.

Figure 12:
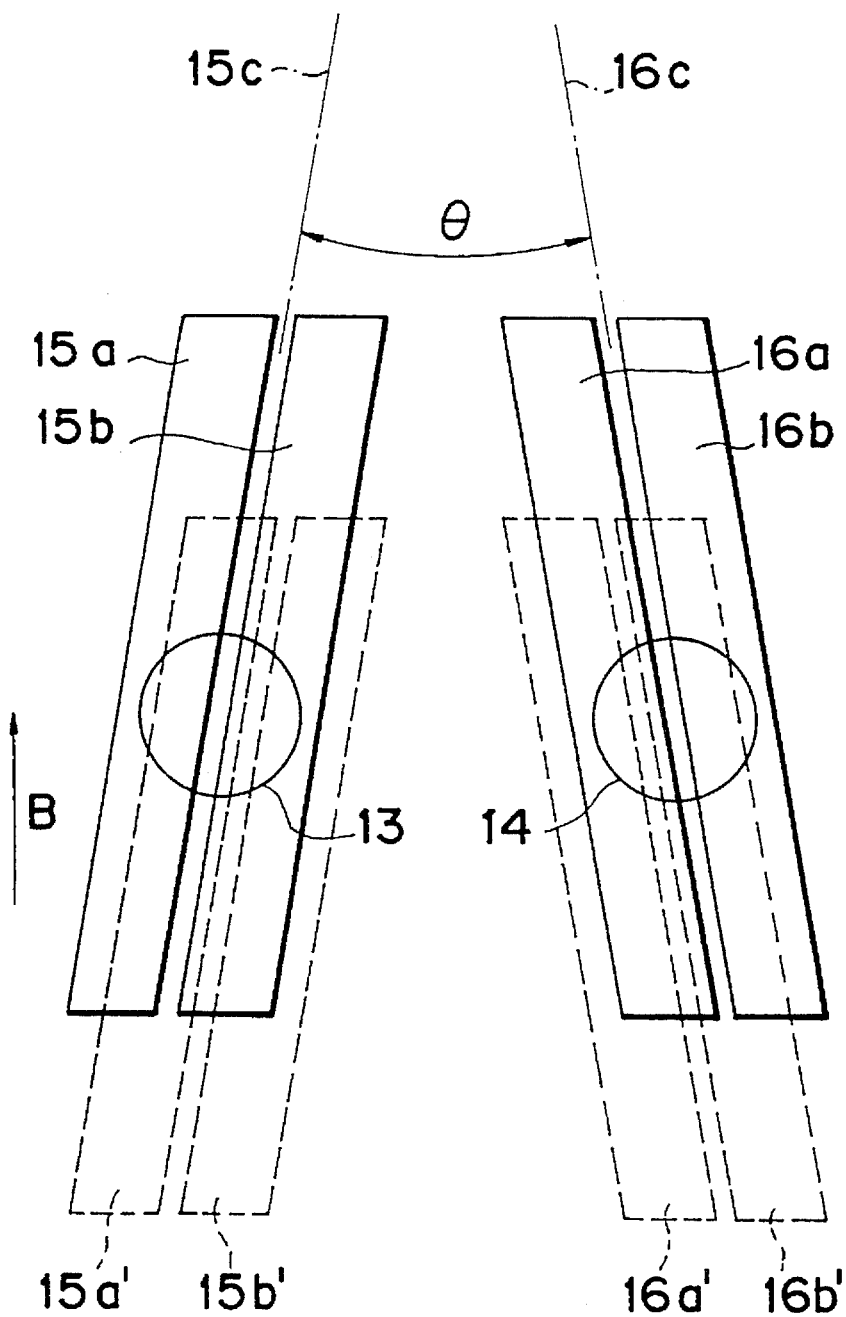
FIG. 12 is a schematic drawing to illustrate a verification function in use of an optical head according to the present invention.

Next described with FIG. 12 are features in shape of light receiving segments in the RF sensor 12 as shown in FIG. 9 or FIG. 11. The optical heads in FIG. 9 and FIG. 11 are characterized in that the 2D light receiving portions 15 and 16 are not parallel to each other but inclined at the angle θ between the dividing lines 15c and 16c.

Generally, there are inevitably present an error of focal length of the convex lens 11 due to the glass processing error, and an error of distance between the convex lens 11 and the RF sensor 12 due to the mechanical processing error. Therefore, the distance between the two spots 13 and 14 on the RF sensor 12 differs to some extent from a designed value in actuality.

If the dividing lines 15c and 16c are spaced in parallel with each other at the above designed value, it is impossible to maintain the positional relation of the spot 13 to the light receiving segment 15a equivalent to the positional relation of the spot 14 to the light receiving segment 16a.

Thus, in case that a direct verification signal 18 is obtained with the output from the light receiving section 15a and the output from the light receiving section 16a, as described with FIG. 9 and FIG. 11, noises such as laser noises and medium noises cannot be eliminated completely so as to relatively raise the noise level, unpreferably resulting in degrading the quality of direct verification signal 18, i.e., the CN ratio.

An effect against such inconvenience is shown in FIG. 12. The two 2D light receiving portions 15' and 16' are located at positions shown by broken lines at a first stage of assembly, which are in condition of imbalance location to the two spots 13 and 14. Moving in parallel and adjusting the RF sensor in the direction of arrow B, the two 2D light receiving portions 15, 16 may be located at the positions shown by the solid lines, whereby the above inconvenience may be overcome.

The angle θ between the two dividing lines 15c and 16c preferably satisfies the following condition:

$|\theta| \leq 30°$, provided $\theta \neq 0°$.

With θ outside the above range, a carrier level of the direct verification signal is lowered, so that a change in carrier level becomes sensitive to a displacement in the direction of arrow B, whereby the adjustment rather requires more time on the contrary. Further, when the objective lens 4 is moved in parallel in the direction normal to the sheet plane of FIG. 8 for autotracking control, the spots 13, 14 move in the direction of arrow B in FIG. 12, increasing the negative influence from the movement.

As described above, the relative positional relation between the two spots 13, 14 and the two 2D light receiving portions 15, 16 can be kept appropriate even with processing errors by adjusting the RF sensor 12 in the two directions shown by the arrows B and C in the plane as shown in FIG. 12 in the present invention.

The reason why the adjustment in the direction of arrow C is required is that there is no assurance that the spots 13, 14 are positioned on the 2D light receiving portions 15, 16 at the first stage of assembly.

However, in case of an RF sensor having light receiving portions with θ=0°, a distance must be adjusted between the convex lens 11 and the RF sensor 12 in addition to the adjustment in the two directions as described, which is very inconvenient.

Figure 13:
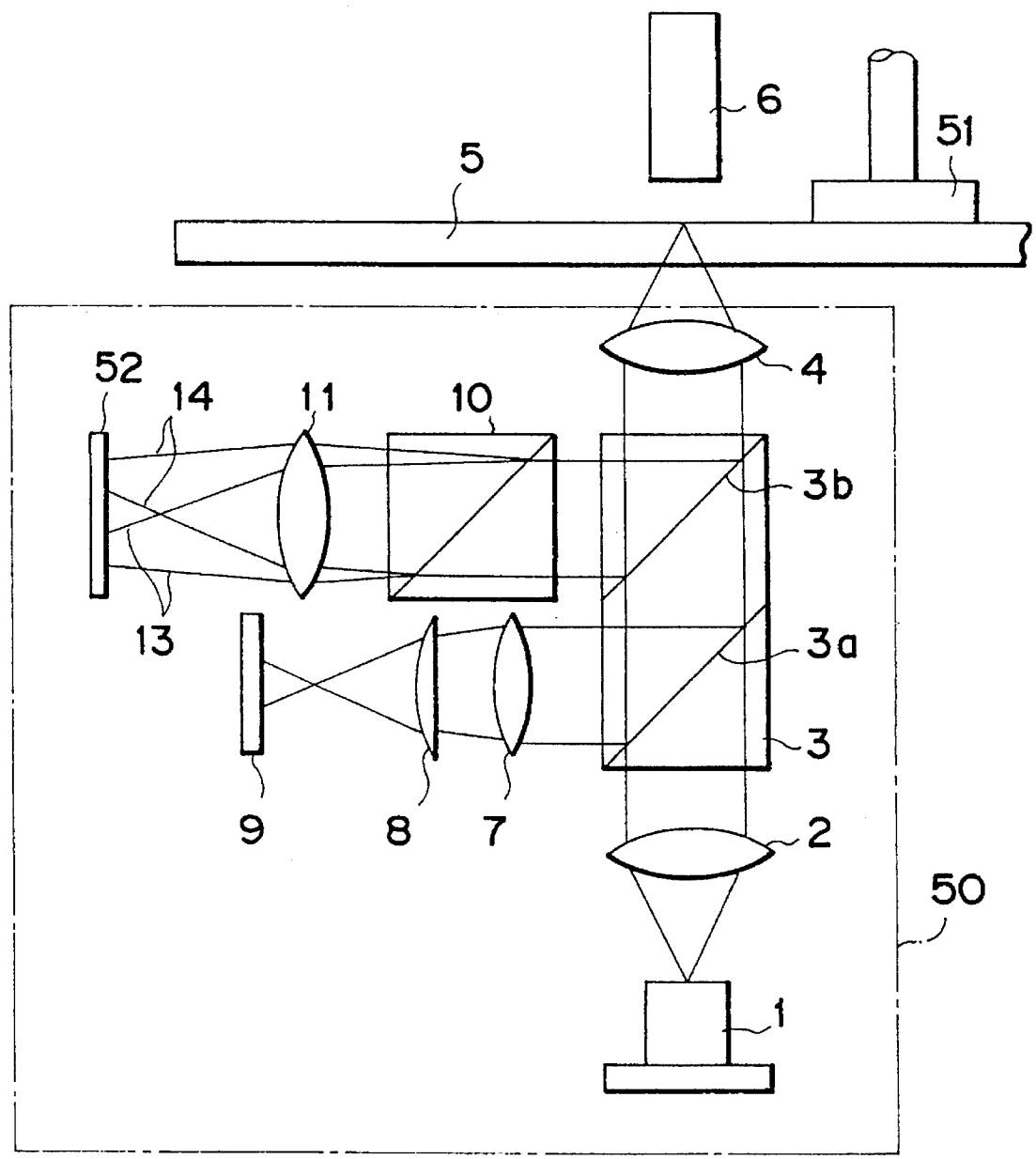
FIG. 13 is a schematic drawing to show the structure of another optical head of the present invention.

FIG. 13 shows a further embodiment of the optical head according to the present invention. A magnetic field modulation type magnetooptical recording/reproducing apparatus using the optical head shown in FIG. 13 is different from the embodiment shown in FIG. 8 in that a turn table 51 turns a magnetooptical record medium 5 to move record tracks thereof relative to the optical head 50 in the direction normal to the sheet plane of FIG. 13.

Optical components in the optical head 50 except for an RF sensor 52 are the same in structure and function as those in FIG. 8, and therefore are omitted to explain herein.

Figure 14:
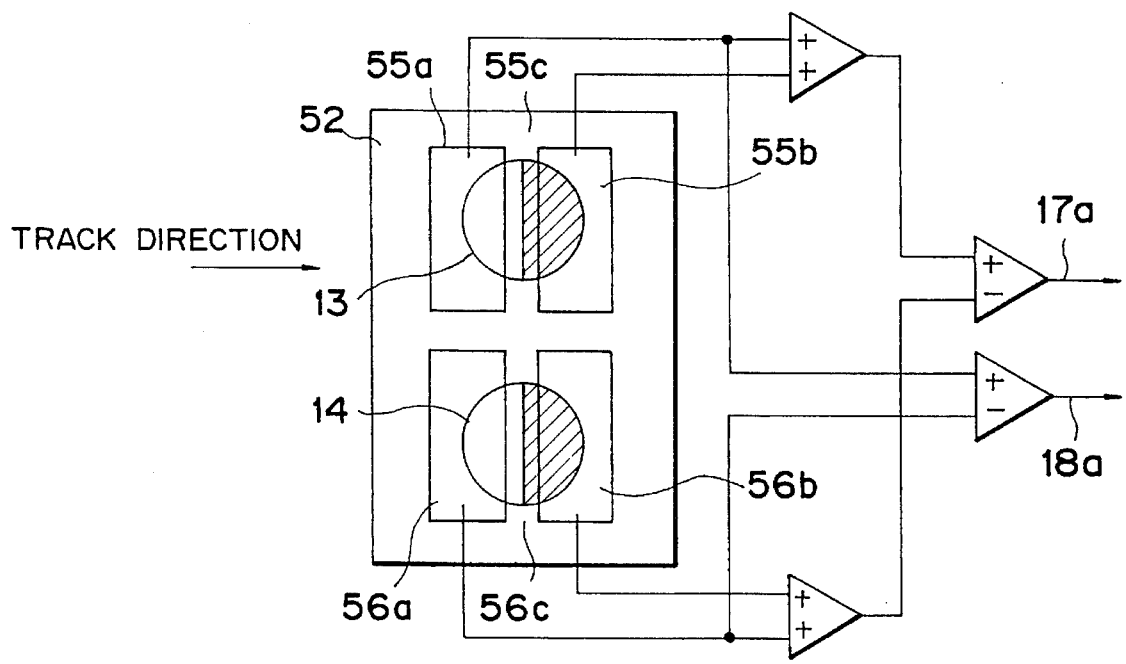
FIG. 14 is a drawing to illustrate a relation between a photodetector of the present invention and light spots.

FIG. 14 schematically shows a relation between a light receiving area and light spots on the RF sensor 52. There are provided on the RF sensor 52, a first 2D light receiving portion 55 comprised of two light receiving segments 55a, 55b divided by a dividing line 55c and a second 2D light receiving portion 56 comprised of two light receiving segments 56a, 56b similarly divided by a dividing lines 56c.

The two beams 13 and 14 comprised of the linearly polarized light components perpendicular to each other, as described with FIG. 8, are condensed such that a centroid of light amount of each beam resides on each dividing line 55c, 56c.

A normal reproduction signal 17a is obtained as a differential output between a sum of outputs from the light receiving segments 55a, 55b and a sum of outputs from the light receiving segments 56a, 56b. A direct verification signal 18a is obtained as a differential output between an output from the light receiving segment 55a and the output from the light receiving segment 56a. This is suitable for reproduction of pit position record signal.

Figure 15:
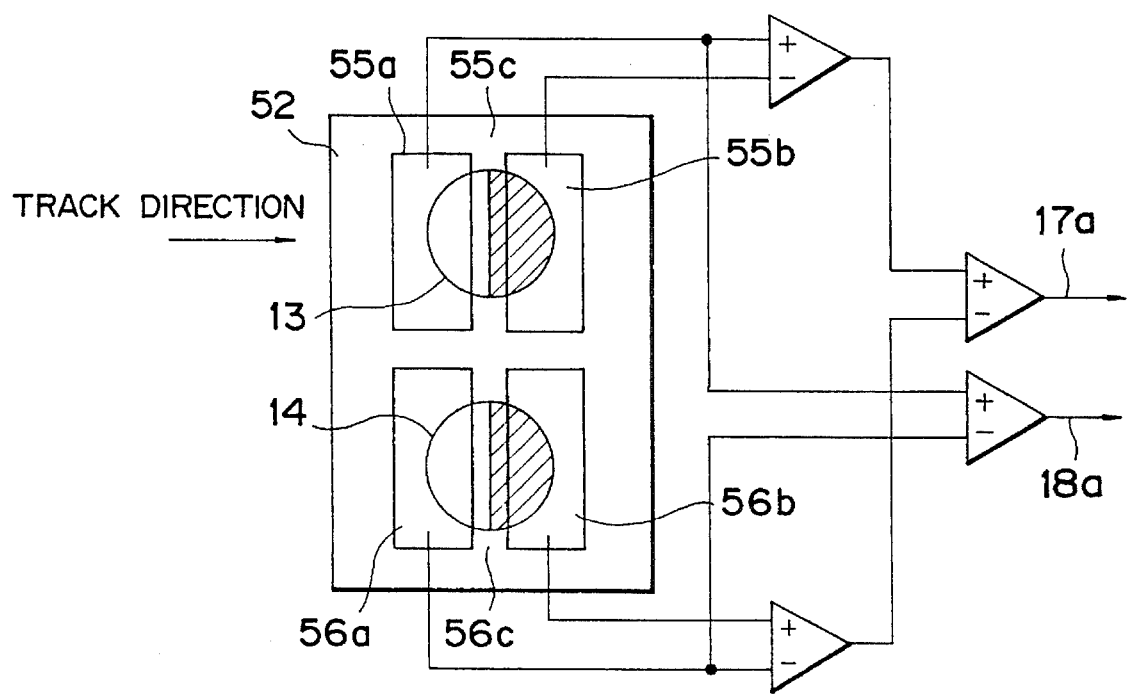
FIG. 15 is a drawing to illustrate a relation between a photodetector of the present invention and light spots.

FIG. 15 shows a further embodiment to show another detection method of reproduction signal. In FIG. 15, a normal reproduction signal 17a is obtained as a differential output between a differential output between an output from the light receiving segment 55a and an output from the light receiving segment 55b, and a differential output between an output from the light receiving segment 56a and an output from the light receiving segment 56b. This is suitable for reproduction of pit edge record signal. A direct verification signal 18a is obtained in the same manner as in the embodiment in FIG. 14.

The optical head for a magnetic field modulation type magnetooptical recording/reproducing apparatus, as described, comprises means for separating the reflected light from the magnetooptical record medium in information record into two beams in the single plane including the radial direction perpendicular to the track direction, and the single photodetector provided with the two light receiving portions receiving the two beams, in which the two 2D light receiving portions are arranged in the plane including the radial direction perpendicular to the track direction, whereby the following advantage may be achieved.

Generally, unavoidable are an error of focal length of the convex lens 11 due to the glass processing error and an error of distance between the convex lens 11 and the RF sensor 12 due to the mechanical processing error, as described before. Then, although the convex lens 11 and the RF sensor 12 are intended to position as designed, the distance between the two spots 13 and 14 on the RF sensor 12 must have an error to some extent to the designed value.

In the present embodiment, as seen from FIG. 14 and FIG. 15, the distance between the spots 13 and 14 varies in the vertical direction in the drawings, which coincides with the direction of extension of the dividing line 15c, 16c. Therefore, the above error does not negatively affect the reproduction signal 17 nor the direct verification signal 18. Accordingly, the precision of mechanical processing of the convex lens 11 and the housing of optical head 4 may be relaxed. From a different view point, the precision in the vertical direction in the drawings may be conveniently relaxed among the precisions required for positioning adjustment of the RF sensor 12 to the spots 13, 14.

Figure 16:
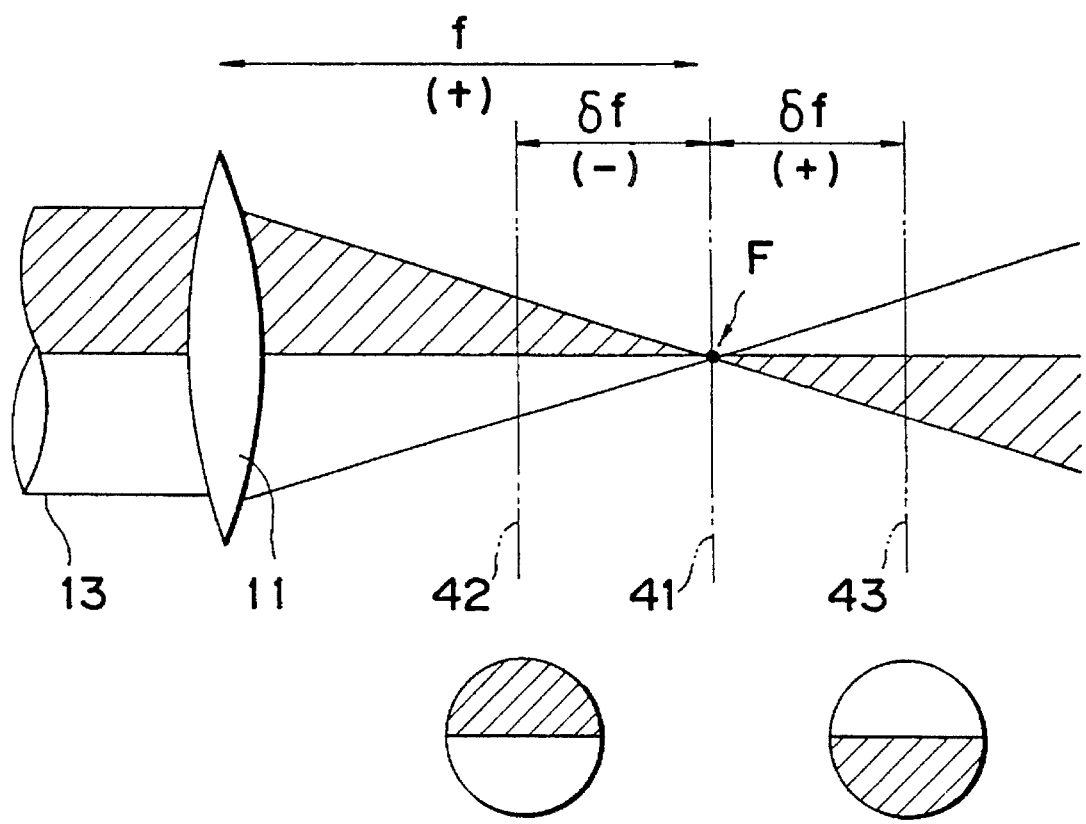
FIG. 16 is a drawing to illustrate the position of photodetector of the present invention.

An important point for the optical head of the present invention as shown in FIG. 8 or FIG. 13 is that there is a preferable condition in a relation between a focal length f of the convex lens 11 and a distance between the convex lens 11 and the RF sensor 12 or the RF sensor 52. The reason will be described with the schematic drawing shown in FIG. 16. For convenience' sake, only the beam 13 is shown out of the two beams formed by the Wollaston prism 10.

The hatched portion in the beam 13 incident into the convex lens 11 is vertically inverted behind the focus position 41 of the convex lens 11, so that the vertical relation is inverted between images at position 42 and at position 43. If the beam 13 includes parallel rays, the imaging point F will be coincident with the focus position 41. Suppose the RF sensor 12 is located at or near the focus position 41. In FIG. 8, the objective lens 4 follows surface fluctuations of the magnetooptical record medium 5 by the autofocus control. There is a control error generally existing. This means that the beam 13 enters the convex lens 11 in a diverging or converging state, so that the imaging point F is displaced back (toward the position 43) or forth (toward the position 42) of the focus position 41. Since the RF sensor is fixed near the focus position 41 as supposed, the blank portion of left half and the hatched portion of right half in each of the spots 13, 14 shown in FIG. 9, FIG. 11, FIG. 14 or FIG. 15 could be inverted depending upon the sign and amplitude of the autofocus control error.

In case that the direct verification signal 18 is produced by the means shown in FIG. 9, FIG. 11, FIG. 14 or FIG. 15, a proper signal may be obtained if the blank portions are located at the light receiving segments 15a, 16a or 55a, 56a, but an inappropriate signal must be obtained if the hatched portions are located there when inverted for the above reason.

Normally, the focal length $f_4$ of the objective lens 4 is 3–5 mm and the focal length f of the convex lens 11 is about 10–40 mm. Assuming $f_4=4$ mm and $f=25$ mm as representative values, the longitudinal magnification thereof is of about 40. Assuming the autofocus control error of about ±1.5 μm, the movement of the focus point F may be approximately ±0.06 mm. Accordingly, with the notations in FIG. 16, the distance between the RF sensor and the focus point 41 of the convex lens is expressed by δf, which preferably satisfies the following condition:

$$|\delta f| \geqq f \times 0.06/25 = 0.0024f.$$

On the other hand, the upper limit of |δf| may be determined as follows. An area of each light receiving portion 15a, 15b, 16a, 16b, 55a, 55b, 56a, 56b cannot be made so larger if the signal reproduction is considered in frequency band of several to several ten MHz. Taking the present technology into account, the upper limit of diameter of spot 13, 14 is about 2 mm. If the objective lens has N. A.=0.5, the beam diameter of beam 13, 14 incident into the convex lens 11 is 4 mm. Accordingly, a preferable upper limit may be set as follows: $|\delta f| \leqq f \times 2/4 = 0.5f$. Also, this upper limit is suitable for keeping appropriate the direct verification signal component, that is, the carrier level, obtained from the blank portions of spots 13, 14 shown in FIG. 9, FIG. 11, FIG. 14 or FIG. 15.

Therefore, it is preferable in keeping the quality of the direct verification signal that the RF sensor 12 is located at a position apart from the focus position of the convex lens element by a distance δf satisfying the following condition:

$$0.0024f \leqq |\delta f| \leqq 0.5f \qquad (1).$$

Further described is the magnetic field modulation type magnetooptical recording/reproducing apparatus using the optical head according to the present invention as described with FIG. 8 to FIG. 15.

Figure 17:
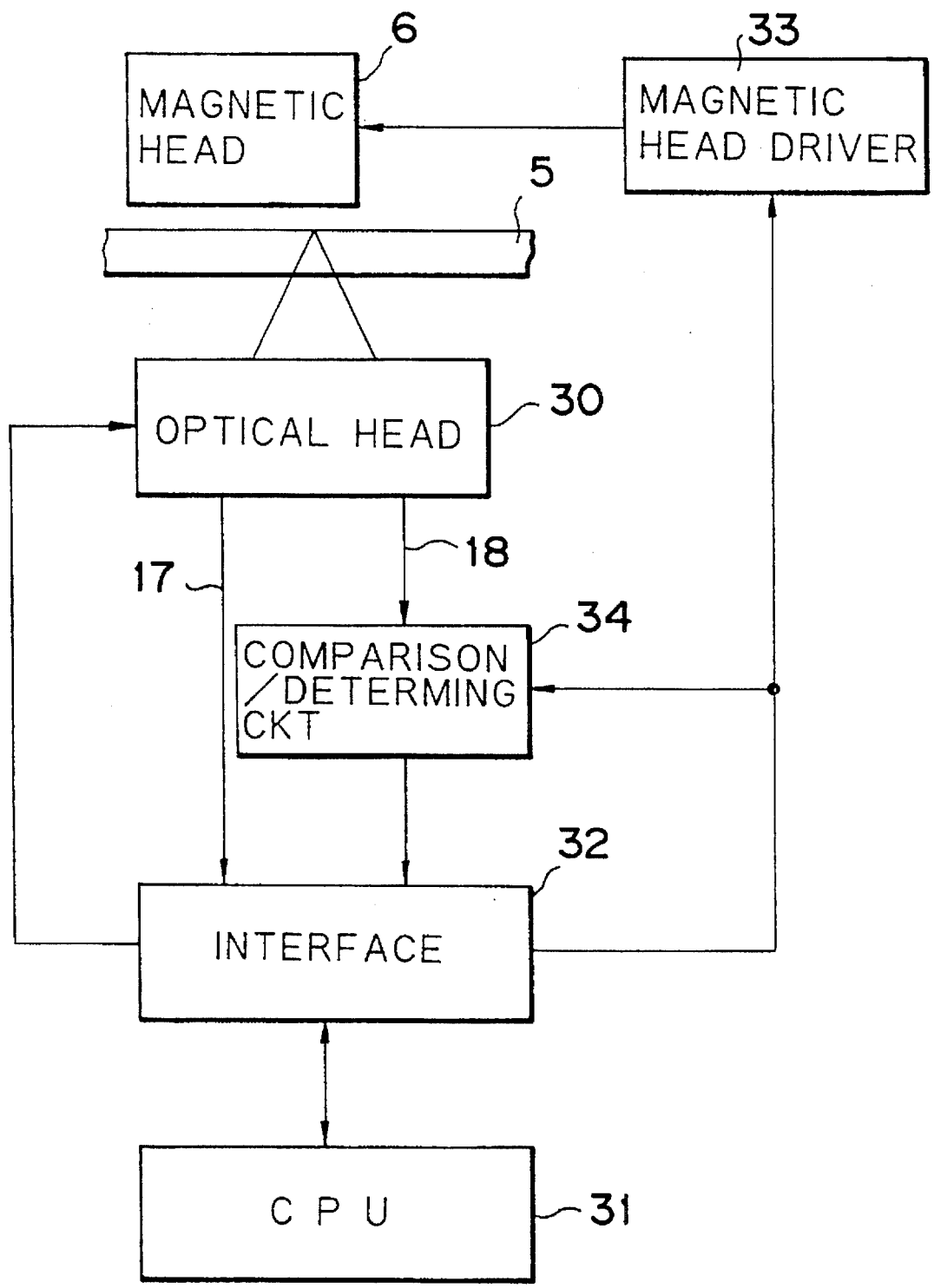
FIG. 17 is a block diagram to illustrate a flow of signals in an optical head of the present invention.

FIG. 17 schematically shows the flow of signals. Upon one-pass writing, an interface 32 receives a command from a CPU 31 and transmits a drive signal and record information to the optical head 30 and a magnetic head driver 33. As described before, the optical head 30 condenses the light onto the magnetooptical record medium 5. On the other hand, the magnetic head driver 33 drives the modulated magnetic field generating means 6 in accordance with the record information to effect the overwriting. A direct verification signal 18 is also obtained at the same time and is transferred to a comparison and judgment circuit 34. The record information is also transferred through the interface 32 to the comparison/determining circuit 34, where the both signals are compared to effect verification. Its result is transmitted to the interface 32. If the record is proper then nothing is further done, while if improper then the record is again carried out.

Figure 18:
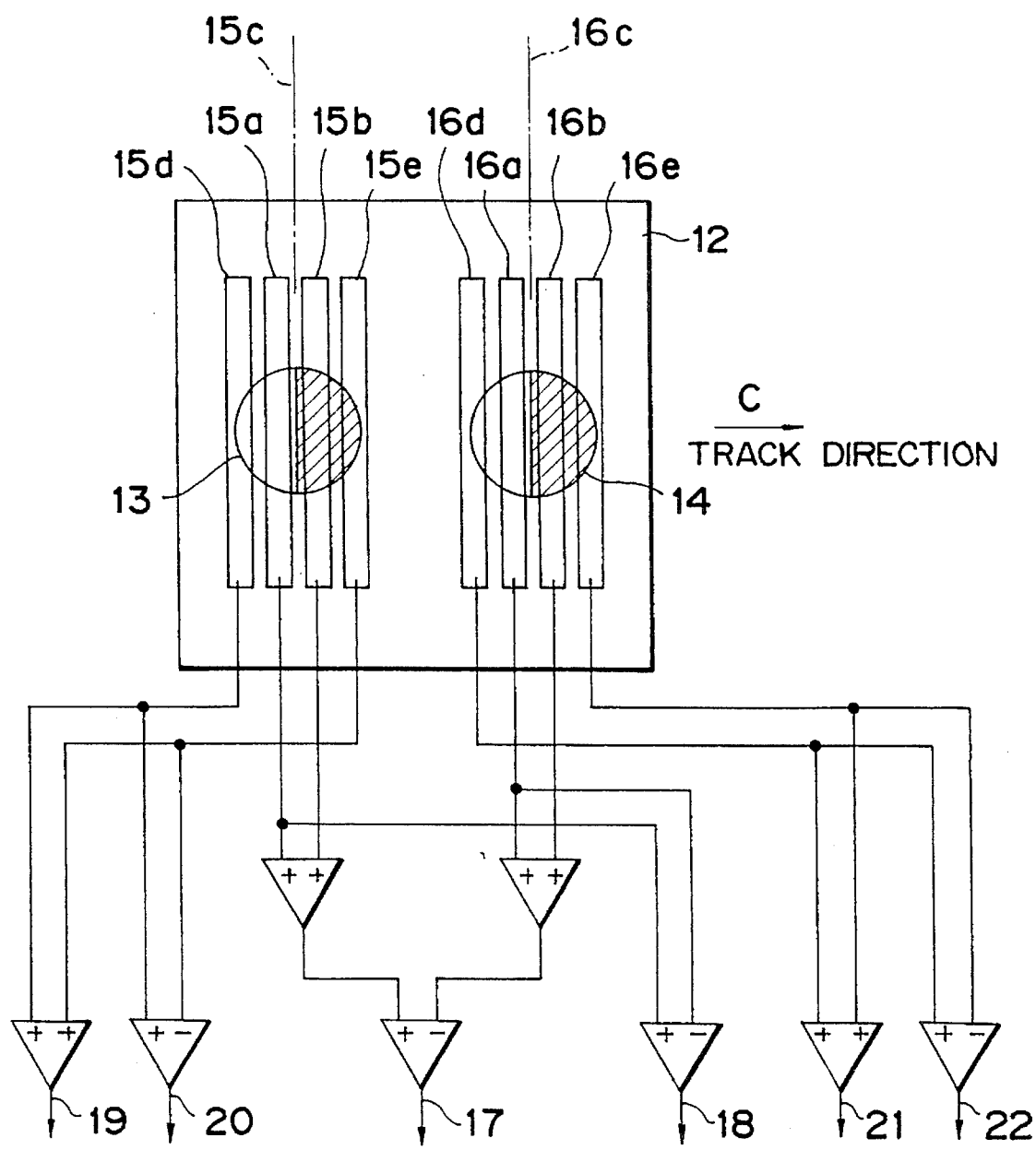
FIG. 18 is a drawing to illustrate a relation between a photodetector according to the present invention and light spots.

FIG. 18 schematically shows a relation between a light receiving area and optical spots on an RF sensor (photodetector) 12 in a further embodiment. There are provided on the RF sensor 12, a first 4D sensor (four-divided light receiving portion) comprised of light receiving segments 15a, 15b, 15d, 15e and a second 4D sensor comprised of light receiving segments 16a, 16b, 16d, 16e. Each of the two 4D sensors is divided into four in the track direction C such that the segments 15a, 15d are symmetric with the segments 15b, 15e with respect to a hypothetical symmetry axis 15c and that the segments 16a, 16d are symmetric with the segments 16b, 16e with respect to a hypothetical symmetry axis 16c. Further, each beam 13, 14 has a spot diameter enough to cover the entire surface of the first or second 4D sensor 15, 16, and the beams are separated at a sufficient gap to prevent cross incidence into incorrect 4D sensors. In order to make each centroid of light quantity of the beam 13, 14 aligned with the hypothetical symmetry axis 15c, 16c, the RF sensor 12 is adjusted in the direction C, based on a sum 19 and a difference 20 between an output from the light receiving segment 15d and an output from the light receiving segment 15e and on a sum 21 and a difference 22 between an output from the light receiving segment 16d and an output from the light receiving segment 16e. In more detail, the RF sensor 12 is adjusted to make the calculation output 19 equal to the calculation output 21 and to make the calculation outputs 20 and 22 approximately zero.

A normal reproduction signal 17 is obtained as a differential output between a sum of outputs from the light receiving segments 15a, 15b and a sum of outputs from the light receiving segments 16a, 16b. A direct verification signal is obtained as a differential output between an output from the light receiving segment 15a and an output from the light receiving segment 16a.

The optical head used in the magnetic field modulation type magnetooptical recording/reproducing apparatus, as described, comprises the means for dividing the reflected light from the magnetooptical record medium into two beams in the plane including the track direction, and the single photodetector provided with the two 4D light receiving portions respectively receiving the two beams, in which the four light receiving segments in each light receiving portion are symmetric about the beam center and juxtaposed in the track direction, whereby the following advantage may be achieved. Each two outside segments 15d, 15e or 16d, 16e in the first or second 4D sensor 15, 16 are used for positioning between the sensors and the beams, while each two inside segments 15a, 15b or 16a, 16b for RF signal detection. By this, a larger spot diameter may be used for positioning, so that the adjustment is easy. On the other hand, only light near the center is used for RF signal detection, so that a signal with sufficient response speed may be obtained from smaller areas of light receiving segments.

Another embodiment of the present invention is described in the following with the drawings.

Figure 19:
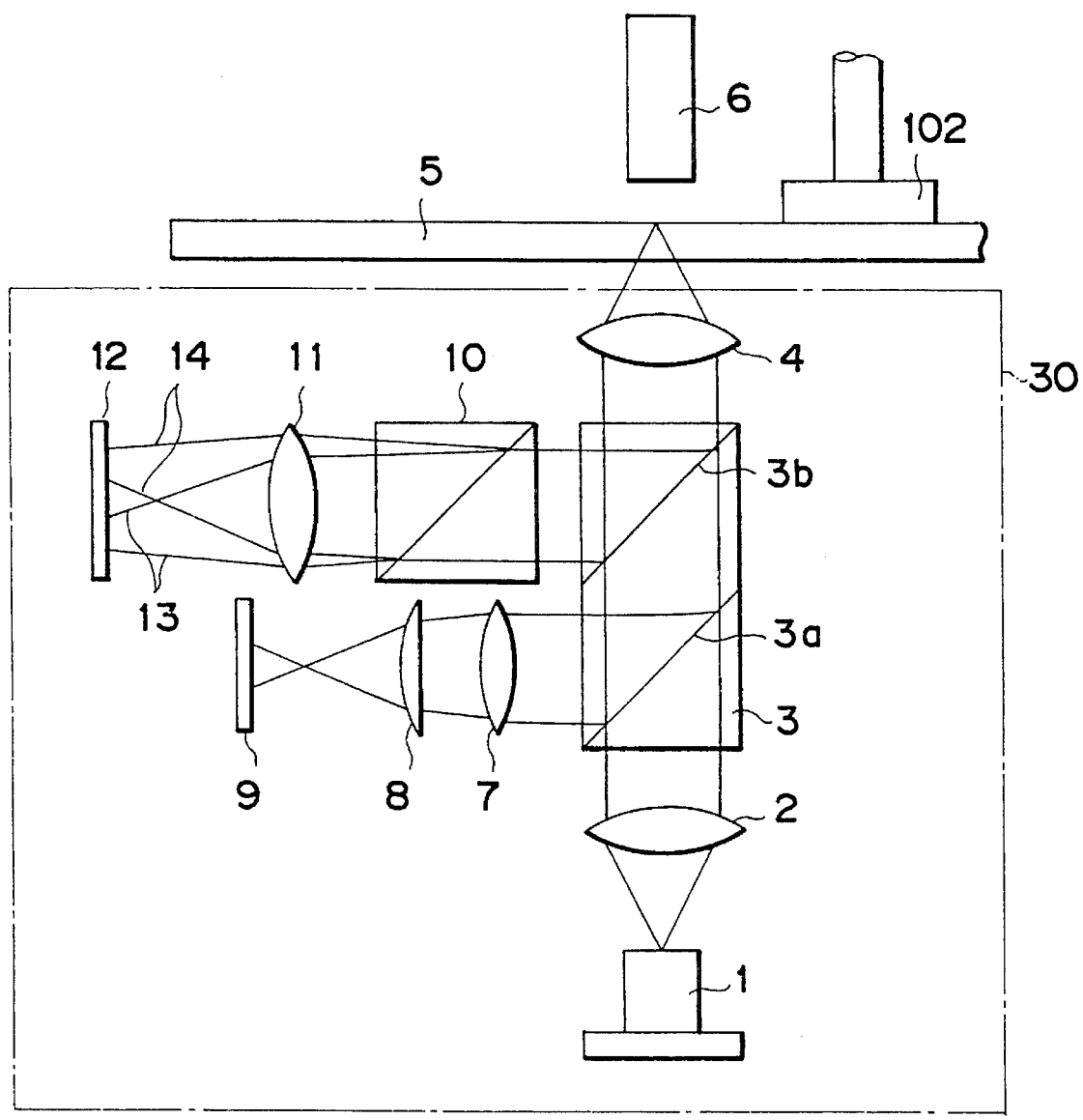
FIG. 19 is a schematic drawing to show the structure of another optical head according to the present invention.

FIG. 19 shows another structure of optical head 30 for magnetic field modulation type magnetooptical recording/reproducing apparatus. A turn table 102 turns a magnetooptical record medium 5 to move it relative to the objective lens 4 in the direction normal to the sheet plane of FIG. 19. The reflected light is separated into two beams by a Wollaston prism 10 in the radial direction perpendicular to the track direction and in the sheet plane of FIG. 19.

Figure 20:
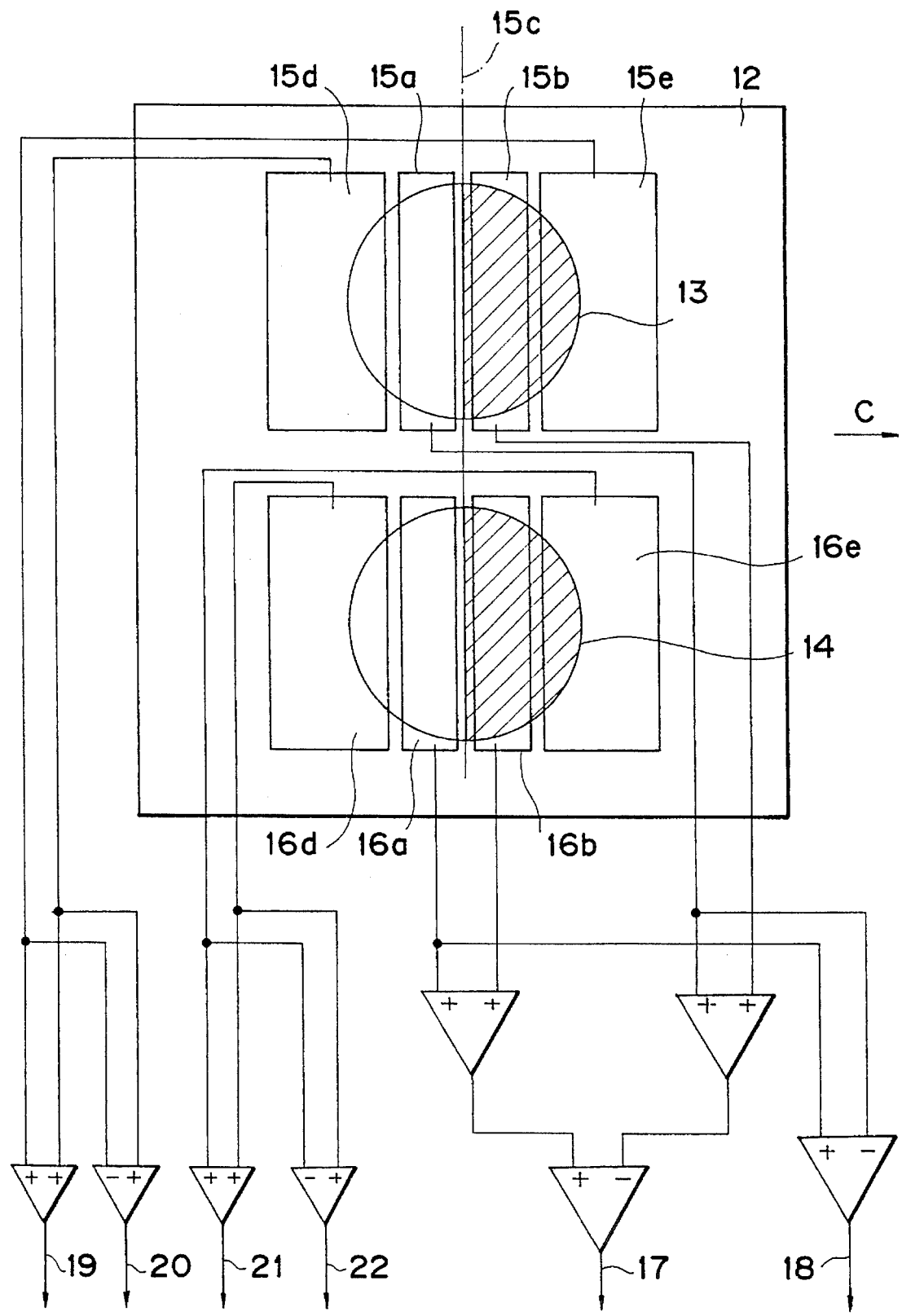
FIG. 20 is a drawing to illustrate a relation between a photodetector according to the present invention and light spots.

FIG. 20 shows the internal structure of RF sensor (photodetector) 12 in the present embodiment. In the RF sensor 12, a first 4D sensor (four-divided light receiving portion) 15 and a second 4D sensor 16 are juxtaposed in a direction perpendicular to a direction in which four light receiving segments in each 4D sensor are juxtaposed. The alignment between the beams 13, 14 and the 4D sensors 15, 16 and the detection method of RF signal are the same as those described with FIG. 18.

While the same function as in the embodiment in FIG. 8 or in FIG. 18 may be attained by such an arrangement of relation between the 4D sensors 15, 16 and the beams 13, 14, a compact or smaller RF sensor may be obtained because the 4D sensors 15, 16 are not juxtaposed in series.

Figure 21:
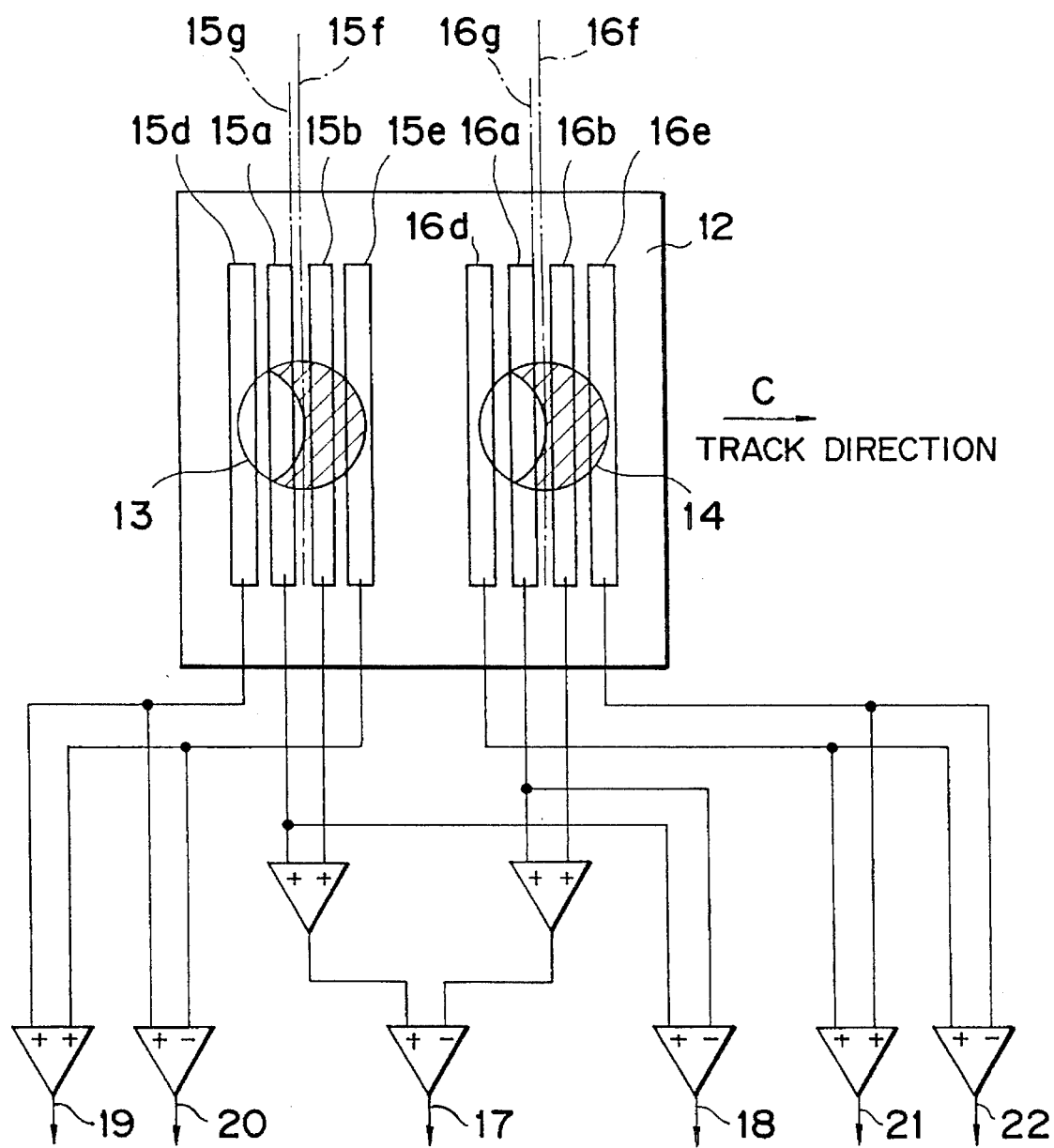
FIG. 21 is a drawing to illustrate a relation between a photodetector according to the present invention and light spots.

FIG. 21 shows another embodiment of the present invention in the arrangement of optical head 30 shown in FIG. 19. The present embodiment is further devised to detect the verification signal component more faithfully from the light receiving segments 15a and 16a, in addition to the operational effect in the above embodiments as described with FIG. 20 and FIG. 18. The alignment between beams 13, 14 and 4D sensors (four-divided light receiving portions) 15, 16 is the same as that described with FIG. 18.

Features of the embodiment in FIG. 21 are described in the following. Reference numeral 15f denotes a hypothetical symmetry axis symmetrically splitting two outside sensor segments 15d, 15e in the 4D sensor 15. A hypothetical symmetry axis 15g of two inside sensor segments 15a, 15b is not coincident with the axis 15f as deviated to the left (toward the high-temperature portion in spot) in FIG. 21. Generally, a low-temperature region in spot 13 has a shape of arrow tail as schematically shown by hatching. Accordingly, offsetting the light receiving segment 15a to the left (toward the high-temperature portion) reduces an area including the low-temperature region so as to remove a factor of noises thereby, so that a better verification signal may be obtained from the high-temperature region. The same effect may be seen with the 4D sensor 16 and the beam 14.

Figure 22:
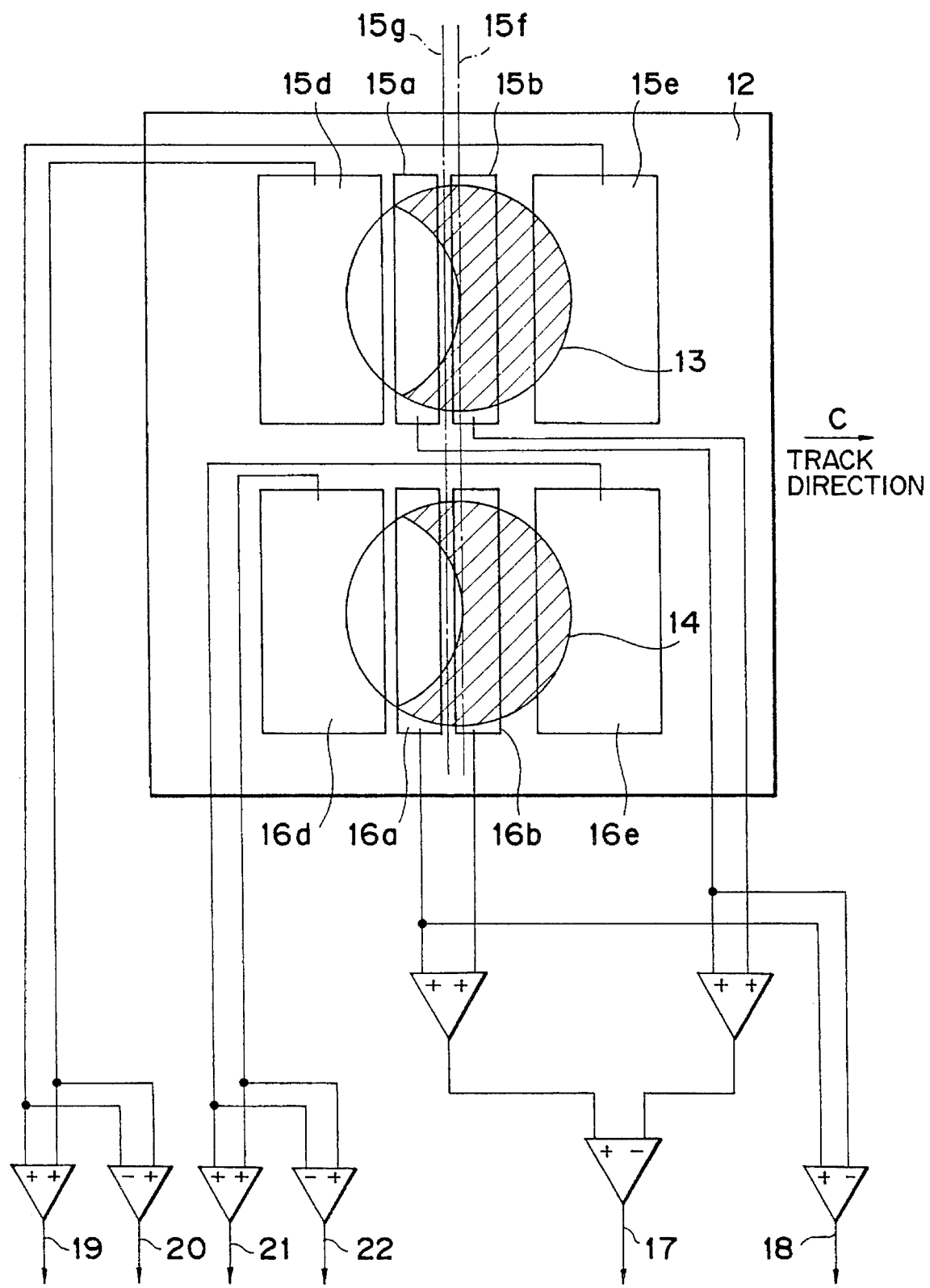
FIG. 22 is a drawing to illustrate a relation between a photodetector according to the present invention and light spots.

FIG. 22 shows another embodiment of the present invention in the structure of optical head 30 shown in FIG. 19. The present embodiment is further devised to detect the verification signal component more faithfully from light receiving segment 15a or 16a, in addition to the operational effect in the embodiment as described with FIG. 19 or FIG. 20. The alignment between beams 13, 14 and 4D sensors (four-divided light receiving portions) 15, 16 is the same as that described with FIG. 18. In FIG. 21, numeral 15f denotes a hypothetical symmetry axis symmetrically splitting two outside sensor segments 15d, 15e in the 4D sensor 15. A hypothetical symmetry axis 15g of two inside sensor segments 15a, 15b is not coincident with the axis 15f as deviated toward the high-temperature portion in spot. Generally, a low-temperature region in spot 13 has a shape of arrow tail as schematically shown by hatching lines. Accordingly, offsetting the light receiving segment 15a to the left (toward the high-temperature portion) reduces an area including the low-temperature region so as to remove a factor of noises, so that a better verification signal may be obtained from the high-temperature region. The same effect may be enjoyed with the 4D sensor 16 and the beam 14.

Figure 23:
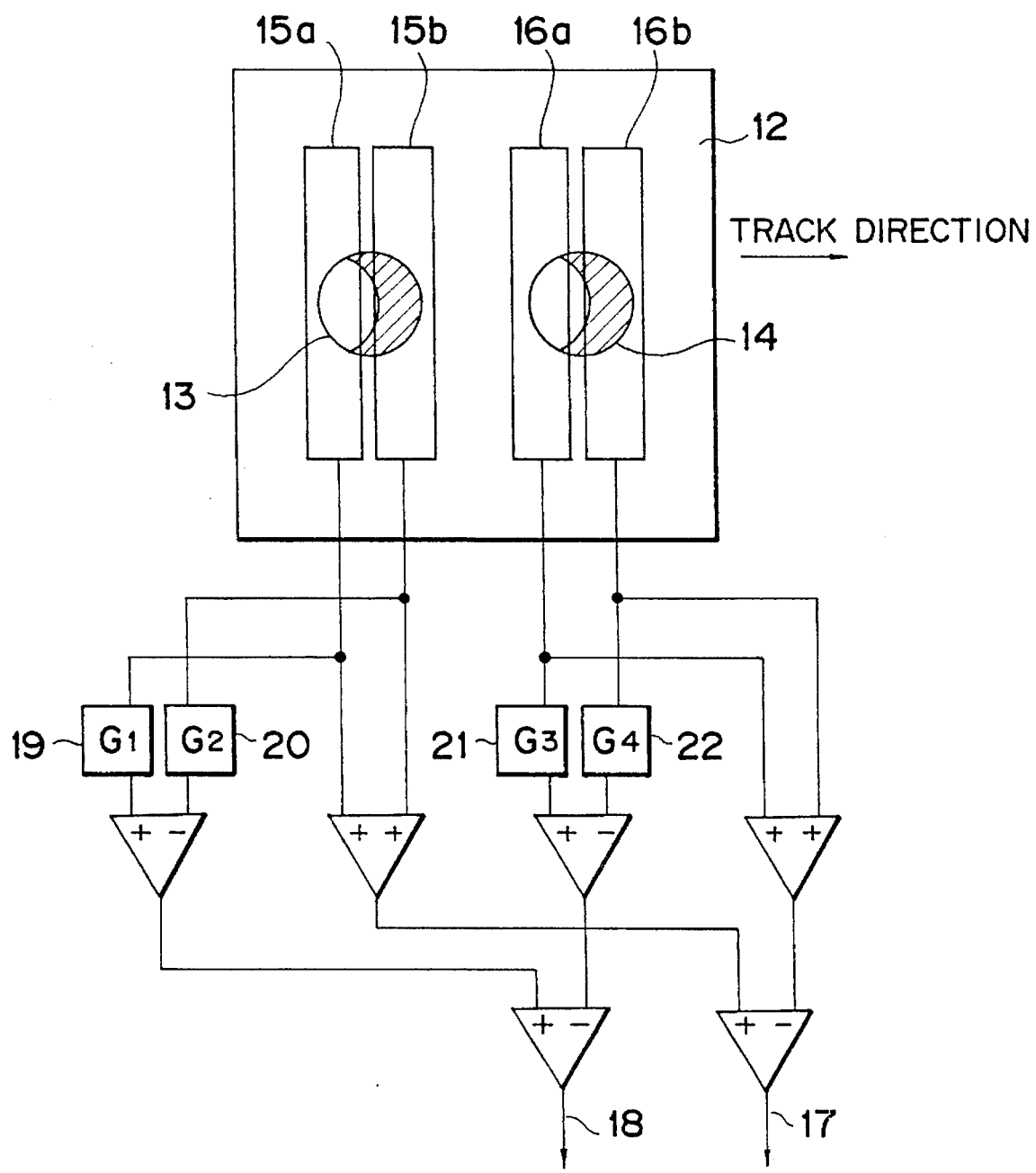
FIG. 23 is a drawing to illustrate a relation between a photodetector according to the present invention and a signal detecting circuit.

FIG. 23 shows a relation between a light receiving area and light spots on an RF sensor (photodetector), and a signal detection circuit. There are provided on the RF sensor 12, a first 2D sensor (two-divided light receiving portion) 15 comprised of two segments 15a, 15b and a second 2D sensor 15 comprised of two segments 16a, 16b. The first and second 2D sensors 15, 16 are respectively split into two in the track direction. The beam 13 is arranged to enter the light receiving segments 15a and 15b as lying over both, while the beam 14 is also arranged similarly to enter the light receiving segments 16a and 16b as lying over both. The center of light quantity of each beam does not necessarily have to be coincident with the center of the sensor segments.

A normal reproduction signal 17 is obtained as a differential output between a sum of outputs from the light receiving segments 15a, 15b and a sum of outputs from the light receiving segments 16a, 16b. The detection of direct verification signal 18 is as follows. A gain adjusting mechanism 19-22 is provided for each segment 15a, 15b, 16a, 16b to set a gain G1, G2, G3, G4 of suitable magnification. A good verification signal may be obtained by calculating a differential signal between a differential signal (15aG1-15bG2) and a differential signal (16aG3-16bG4).

The theory of the calculation is described in the following. First in the spot 13, let a ratio of leak-in low-temperature region in the segment 15a be J and a ratio of leak-in high-temperature region in the segment 15b be K. Similarly in the spot 14, let a ratio of leak-in low-temperature region in the segment 16a be L and a ratio of leak-in high-temperature region in the segment 16b be M.

For simplicity, a loss in insensitive zone in 2D sensor is ignored, and outputs are defined as follows: through the first RF sensor 15, V1 a total signal output obtained from the high-temperature region in the spot 13; R1 a total signal output obtained from the low-temperature region; v1 a signal output from the segment 15a; r1 a signal output from the segment 15b; similarly through the second RF sensor 16, V2 a total signal output obtained from the high-temperature region in the spot 14; R2 a total signal output obtained from the low-temperature region; v2 a signal output from the segment 16a; r2 a signal output from the segment 16b. Then, the following equations may be obtained. For the first RF sensor, $$r1 = (1-J)R1 + KV1 \tag{3};$$

$$v1 = JR1 + (1-K)V1 \tag{4}.$$

For the second RF sensor, $$r2 = (1-L)R2 + MV2 \tag{5};$$

$$v1 = LR2 + (1-M)V2 \tag{6}.$$

Further, eliminating R1 from the equations (3) and (4), $$V1 = \frac{(1-J)v1 - Jr1}{1 - (J+K)}. \tag{7}$$

Similarly, eliminating R2 from the equations (5) and (6), $$V2 = \frac{(1-L)v2 - Lr2}{1 - (L+M)}. \tag{8}$$

Accordingly, the gains may be set as follows from the equations (7) and (8):

G1=i-J; G2=J;

G3=i-L; G4=L.

Then, the differential signals (15aG1-15bG2) and (16aG3-16bG4) can exclude leak-in signals from the low-temperature regions.

Another embodiment of the present invention will be described in detail with the drawings. FIG. 19 shows another structure of optical head 30. The optical head in FIG. 19 is different from that in FIG. 8 in that the magnetooptical disk medium 5 is moved relative to the objective lens 4 in the direction normal to the sheet plane of FIG. 19. Also, the separation direction of beams by the Wollaston prism 10 is perpendicular to the track direction and within the sheet plane of FIG. 19.

Figure 24:
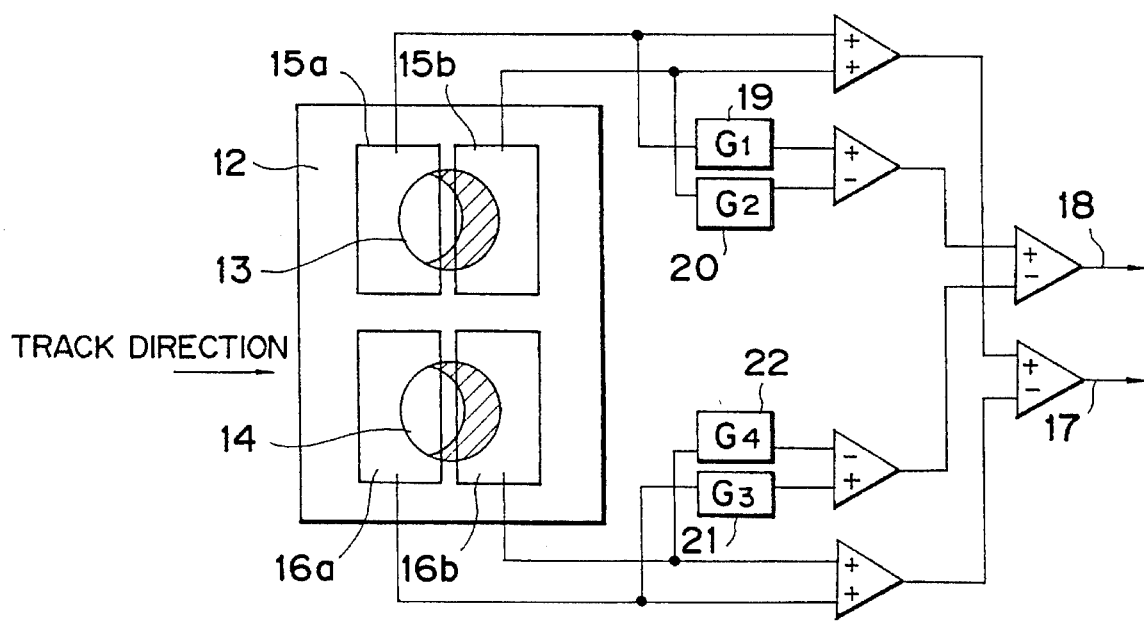
FIG. 24 is a drawing to illustrate a relation between a photodetector according to the present invention and a signal detecting circuit.

FIG. 24 shows a relation between a light receiving area and light spots on an RF sensor (photodetector) 12 suitable for the above optical head. There are arranged in the RF sensor 12, a first 2D sensor (two-divided light receiving portion) 15 and a second 2D sensor 16 juxtaposed perpendicular to the arrangement direction of segments (i.e., to the track direction). A beam 13 is arranged to enter the segments 15a and 15b as lying over them, while a beam 14 is also arranged similarly to enter the segments 16a and 16b as lying over them. The center of light quantity of each beam does not necessarily have to be coincident with the center of sensor segments. The same elements are denoted by the same numerals as those in FIG. 23, and have the same operational effects.

Then, a direct verification signal 18 is also detected in the present embodiment similarly as in FIG. 23. In detail, the segments 15a, 15b, 16a, 16b are given gains G1-G4 of respectively proper magnifications. Then, a proper signal may be obtained by calculating a differential signal between the differential signal (15aG1-15bG2) and the differential signal (16aG3-16bG4).

Figure 25:
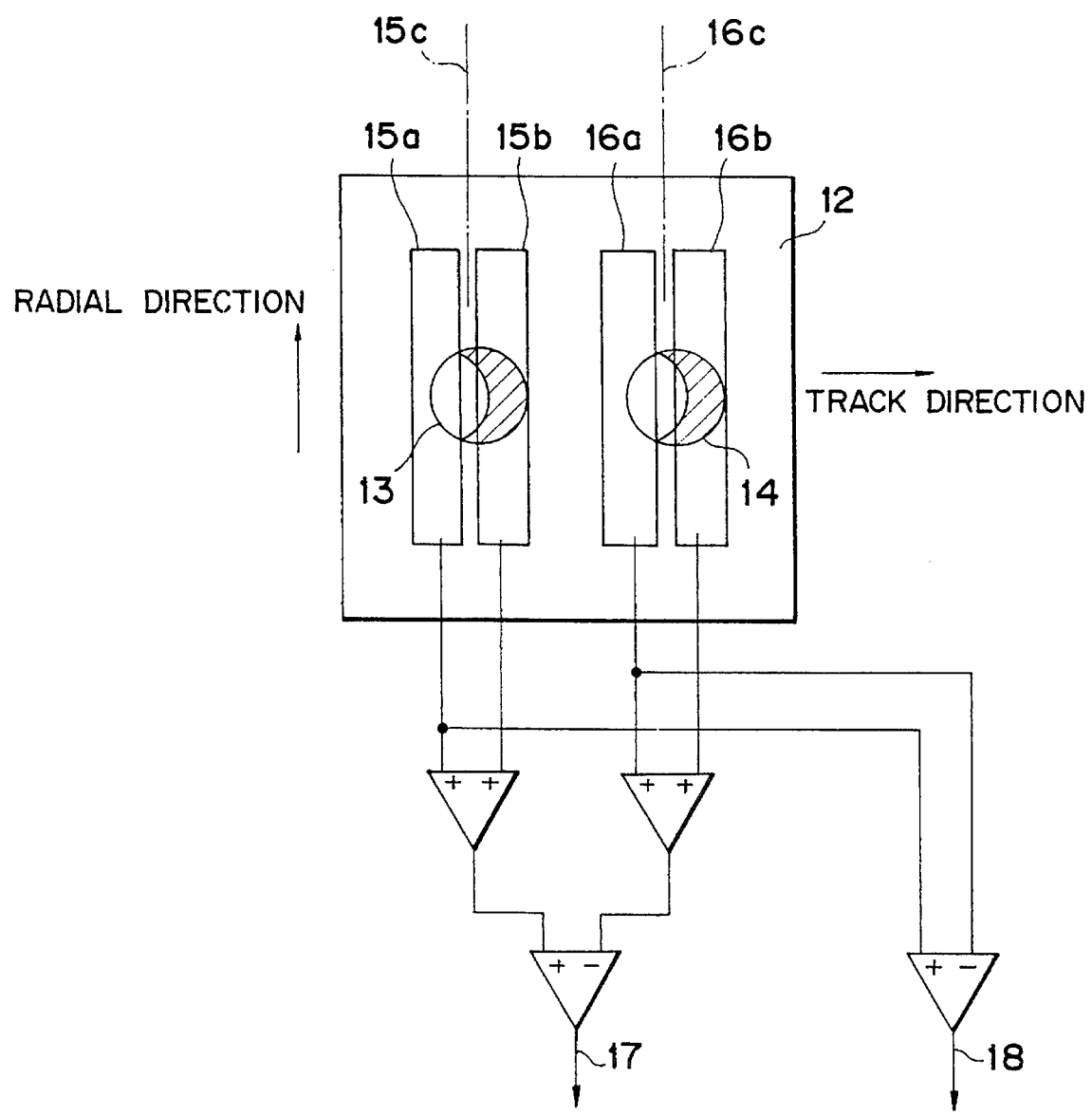
FIG. 25 is a drawing to illustrate a relation between an RF sensor according to the present invention and light spots.

FIG. 25 shows a relation between a light receiving area and light spots on an RF sensor (photodetector) 12. There are provided on the RF sensor 12, a first 2D sensor (two-divided light receiving portion) comprised of two segments 15a, 15b and a second 2D sensor comprised of two segments 16a, 16b. Each of the two sensors is divided into two in the track direction, such that a hypothetical symmetry axis 15c of the segments 15a, 15b is shifted to the left (toward the spot high-temperature region) with respect to the center of light quantity of the beam 13 and that a hypothetical symmetry axis 16c of the segments 16a, 16b is shifted to the left (toward the spot high-temperature region) with respect to the center of light quantity of the beam 14.

In summary, the optical head used in the magnetic field modulation type magnetooptical recording/reproducing apparatus, comprises the means for dividing the reflected light from the magnetooptical record medium into two beams in the plane including the track direction, and the two 2D light receiving portions provided on the single photodetector to respectively receive the two beams, in which the 2D light receiving portions are asymmetric each with respect to the center of each beam and juxtaposed in the track direction.

A normal reproduction signal 17 is obtained as a differential output 17 between a sum of outputs from the segments 15a, 15b and a sum of outputs from the segments 16a, 16b. A direct verification signal 18 is obtained as a differential output between an output from the segment 15a and an output from the segment 16a. The direct verification signal 18 includes less signal from the low-temperature regions, because the hypothetical symmetry axes 15c, 16c of the 2D sensors 15, 16 are shifted toward the high-temperature regions with respect to the center of light quantity of beams. This reduces a factor of noises, whereby a better direct verification signal may be obtained.

Another embodiment of the present invention will be described in detail with the drawings. FIG. 19 shows another structure of optical head. The optical head in FIG. 19 is different from that in FIG. 8 in that the magnetooptical record medium 5 is moved relative to the objective lens 4 in the direction normal to the sheet plane of FIG. 19. The separation direction of beams by the Wollaston prism 10 is perpendicular to the track direction and within the sheet plane of FIG. 19.

Figure 26:
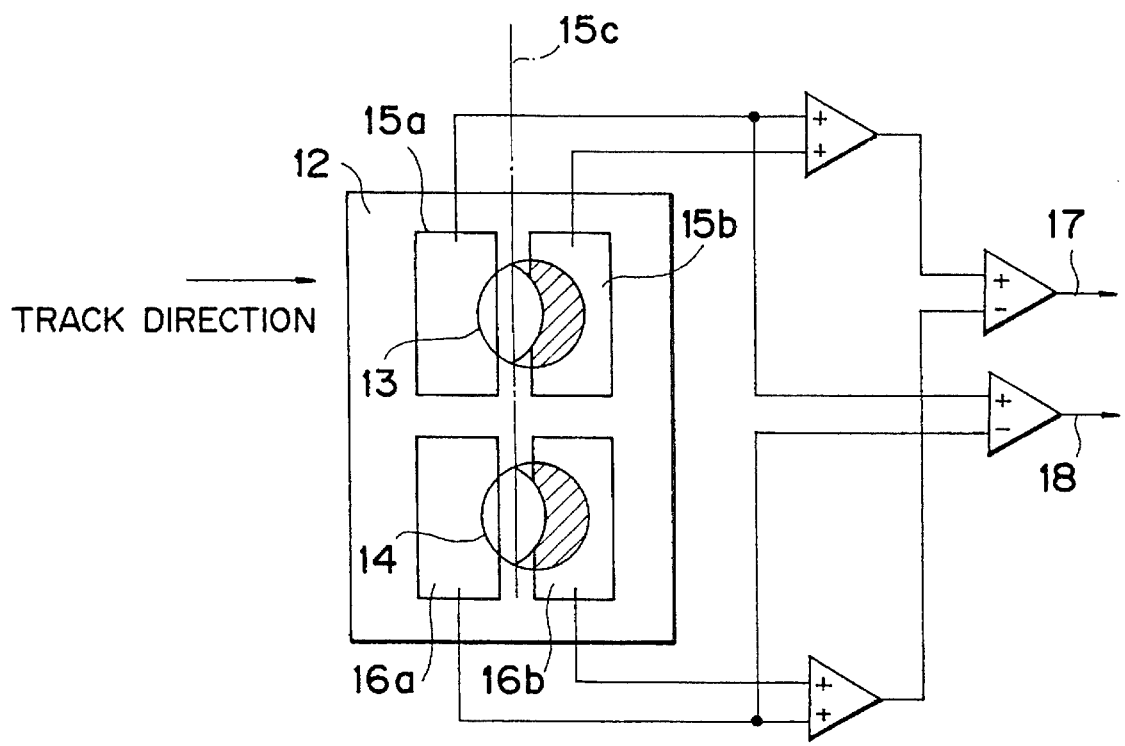
FIG. 26 is a drawing to illustrate a relation between an RF sensor according to the present invention and light spots.

FIG. 26 shows a relation between a light receiving area and light spots on an RF sensor suitable for the above optical head. There are provided in the RF sensor, a first 2D sensor comprised of two segments 15a, 15b and a second 2D sensor comprised of two segments 16a, 16b arranged such that the sensors are juxtaposed in the direction perpendicular to the arrangement direction of the segments (i.e., to the track direction). The same elements are given the same numerals as those in FIG. 25, and have the same operational effects. Accordingly, the direct verification signal 18 also includes less signal from the low-temperature region in the present embodiment, because the hypothetical symmetry axes 15c, 16c of the 2D sensors 15, 16 are shifted toward the high-temperature regions with respect to the center of light quantity of beams. Therefore, a better direct verification signal may be obtained as a result of reduction in a factor of noises.

Figure 27:
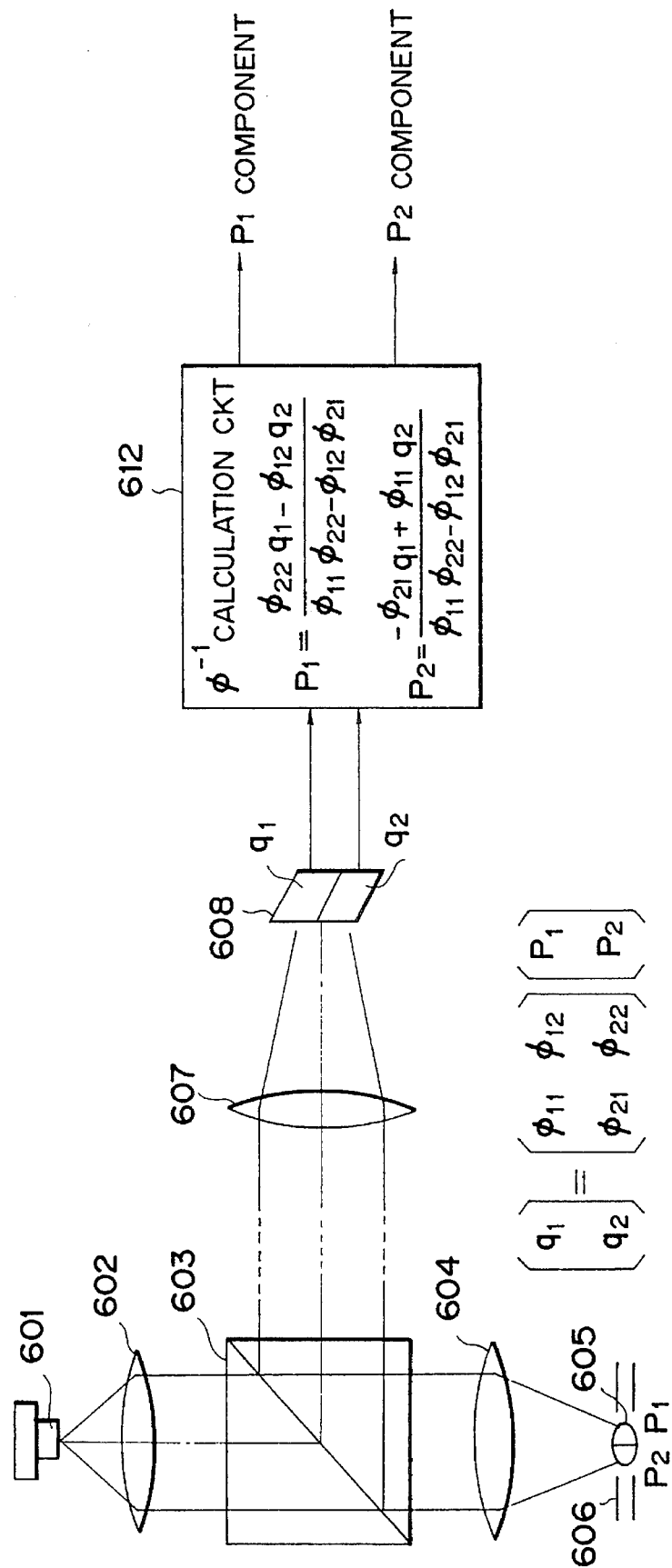
FIG. 27 is a constitutional drawing of an apparatus in an embodiment of the present invention.
Figure 28:
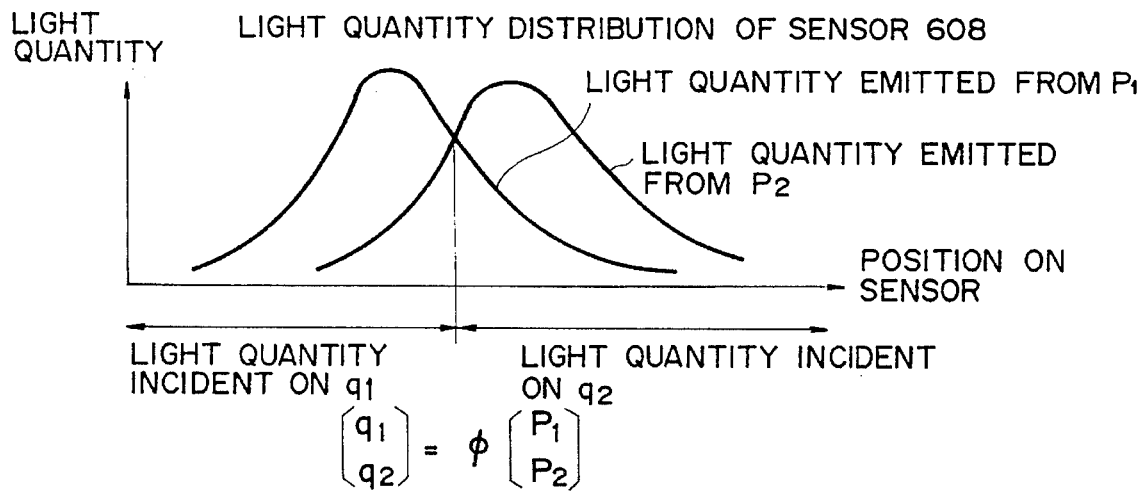
FIG. 28 is a drawing to show a light quantity distribution of a sensor 608 shown in FIG. 27.
Figure 29:
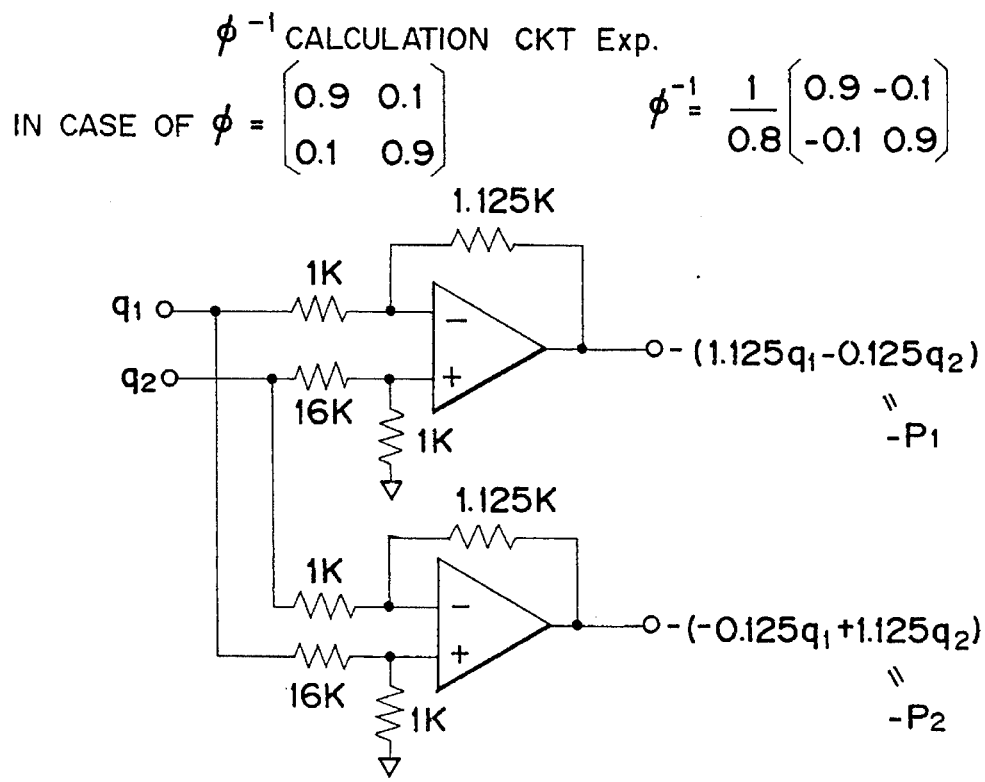
FIG. 29 is a circuit diagram to show an example of $\phi^{-1}$ calculation circuit 612 shown in FIG. 27.

FIG. 27 is a constitutional drawing of apparatus to show another embodiment of the present invention, FIG. 28 a drawing to show a distribution of light quantity of incident light into a sensor 608, and FIG. 29 a circuit diagram to show an example of $\phi^{-1}$ calculation circuit 612 in FIG. 27.

In FIG. 27, light emitted from a semiconductor laser 601 passes through a lens 602, a beam splitter 603 and a lens 604 then to irradiate a record medium 606.

Light reflected from a spot 605 passes through the lens 604, the beam splitter 603, an unrepresented another optical system and a lens 607 to enter a two-divided sensor 608. Outputs of sensor segments are denoted by $q_1$ and $q_2$.

An area on the spot is also divided into two. A light quantity from each divided area is denoted by $p_1$ or $p_2$. A relation between $p_1$, $p_2$ and $q_1$, $q_2$ is described with FIG. 28. The light from $p_1$ is dispersed on the sensor, as described, while distributed more on the segment on the $q_1$ side. On the other hand, the light from $p_2$ is distributed more on the segment on the $q_2$ side. In this case, a mapping $\phi$ from a vector $(p_1, p_2)$ to a vector $(q_1, q_2)$ is uniquely determined by the optical system. For example, suppose ninety percent of light quantity of light from $p_1$ impinges on $q_1$, remaining ten percent thereof on $q_2$, ninety percent of light quantity of light from $p_2$ on $q_2$, remaining ten percent thereof on $q_1$, and no other light enters the sensor. Then, the mapping $\phi$ may be expressed by the following matrix.

$$\phi = \begin{bmatrix} 0.9 & 0.1 \\ 0.1 & 0.9 \end{bmatrix}$$

A $\phi^{-1}$ calculation circuit calculates an inverse of $\phi$. This process is detailed below.

Let the mapping $\phi$ defined as follows:

$$\phi = \begin{bmatrix} \phi_{11} & \phi_{12} \\ \phi_{21} & \phi_{22} \end{bmatrix}.$$

Then, the $p_1$ component and the $p_2$ component may be extracted by the following calculation.

$$p_1 = \frac{\phi_{22} q_1 - \phi_{12} q_2}{\phi_{11}\phi_{22} - \phi_{12}\phi_{21}}$$

$$p_2 = \frac{-\phi_{21} q_1 + \phi_{11} q_2}{\phi_{11}\phi_{22} - \phi_{12}\phi_{21}}$$

Here, the denominators may be ignored, which are constants for the purpose of removing the cross talk components of $p_1$ and $p_2$.

FIG. 29 shows an example of this calculation circuit, in which a single operation amplifier is used to obtain $p_1$ and $p_2$. Outputs of the amp are inverted.

Figure 30:
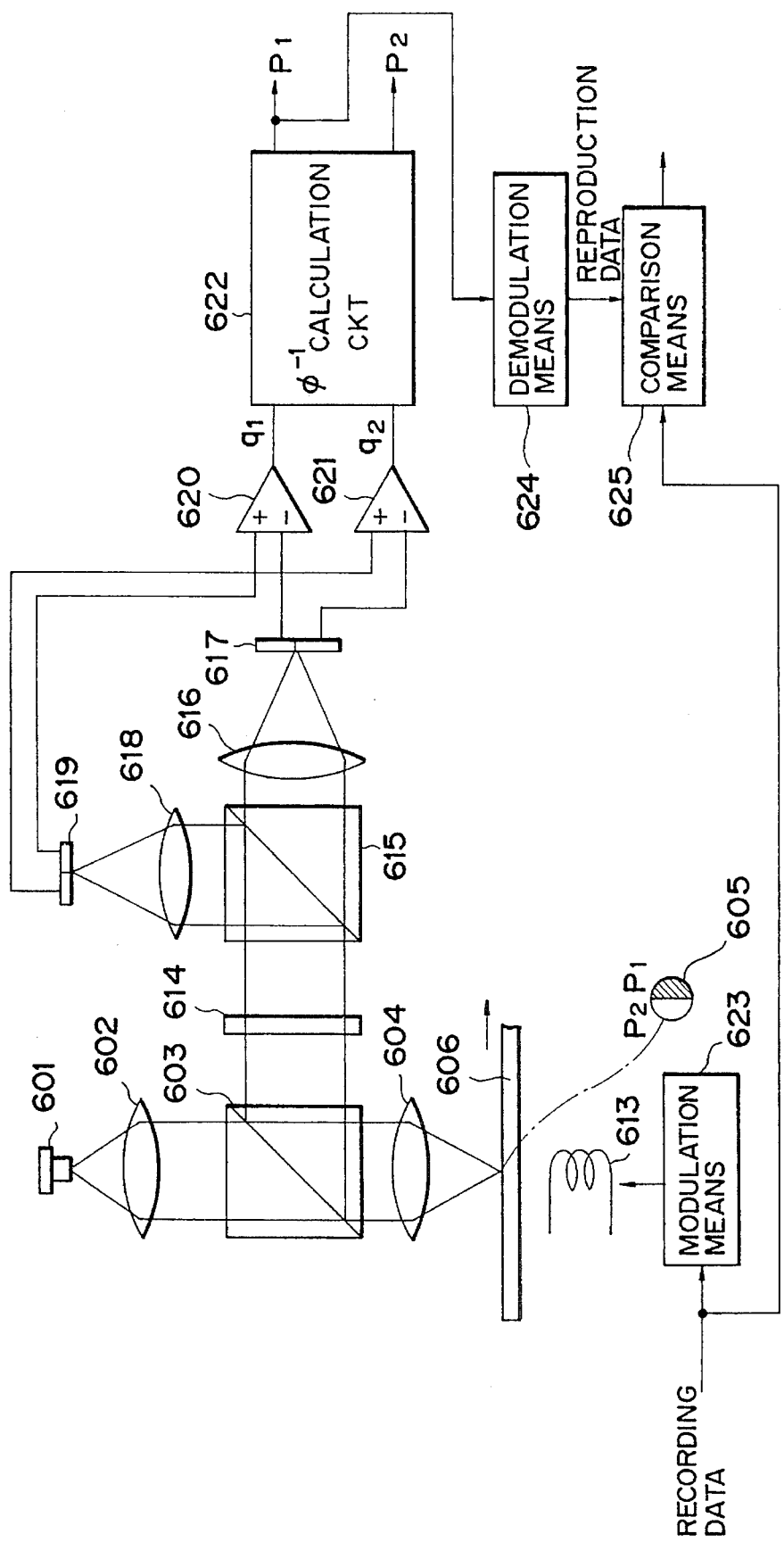
FIG. 30 is a constitutional drawing to show an apparatus in another embodiment.

FIG. 30 shows an embodiment in which the information reading method as described is used in a magnetooptical disk drive apparatus of the present invention.

While a light spot 605 irradiates a magnetooptical disk 606, a modulated magnetic field is applied by a magnetic coil 613 to the disk so that a signal modulated by a modulator 623 is recorded. The light reflected from the disk 606 passes through a lens 604, a beam splitter 603 and a half wave plate 614, and is then split by a polarized light beam splitter 615 into two beams different in direction of Kerr rotation angle. Each beam passes through a lens 616, 618 to irradiate a sensor 617, 619. A magnetooptical signal may be extracted by calculating a difference between a signal from the sensor 617 and a signal from the sensor 619. Each of the sensors 617, 619 is divided into two, and magnetooptical components $q_1$, $q_2$ are extracted by differential amplifiers 620, 621 for the corresponding segments. The relation $\phi$ is preliminarily known between the signals $p_1$, $p_2$ reflected from the two spot regions on the record medium and the signals $q_1$, $q_2$. Thus, the $\phi^{-1}$ calculation circuit can calculate a magnetooptical signals from the respective regions $p_1$, $p_2$.

This apparatus can check recorded information with the magnetooptical components of reflected light while effecting the recording in magnetic field modulation.

Since the magnetooptical disk 606 is moving in the direction of arrow in FIG. 30, the $p_1$ region reflects the information recorded in the region of optical spot 605. Since the $p_2$ region is in recording process, it includes previous information before recording. Therefore, a signal from this region is unnecessary.

The $\phi^{-1}$ calculation circuit 622 outputs a signal component generated from $p_1$. This signal is demodulated by a demodulator 624, and a comparator 625 compares the reproduction data with recorded data to check whether the recording is correctly carried out.

Figure 31:
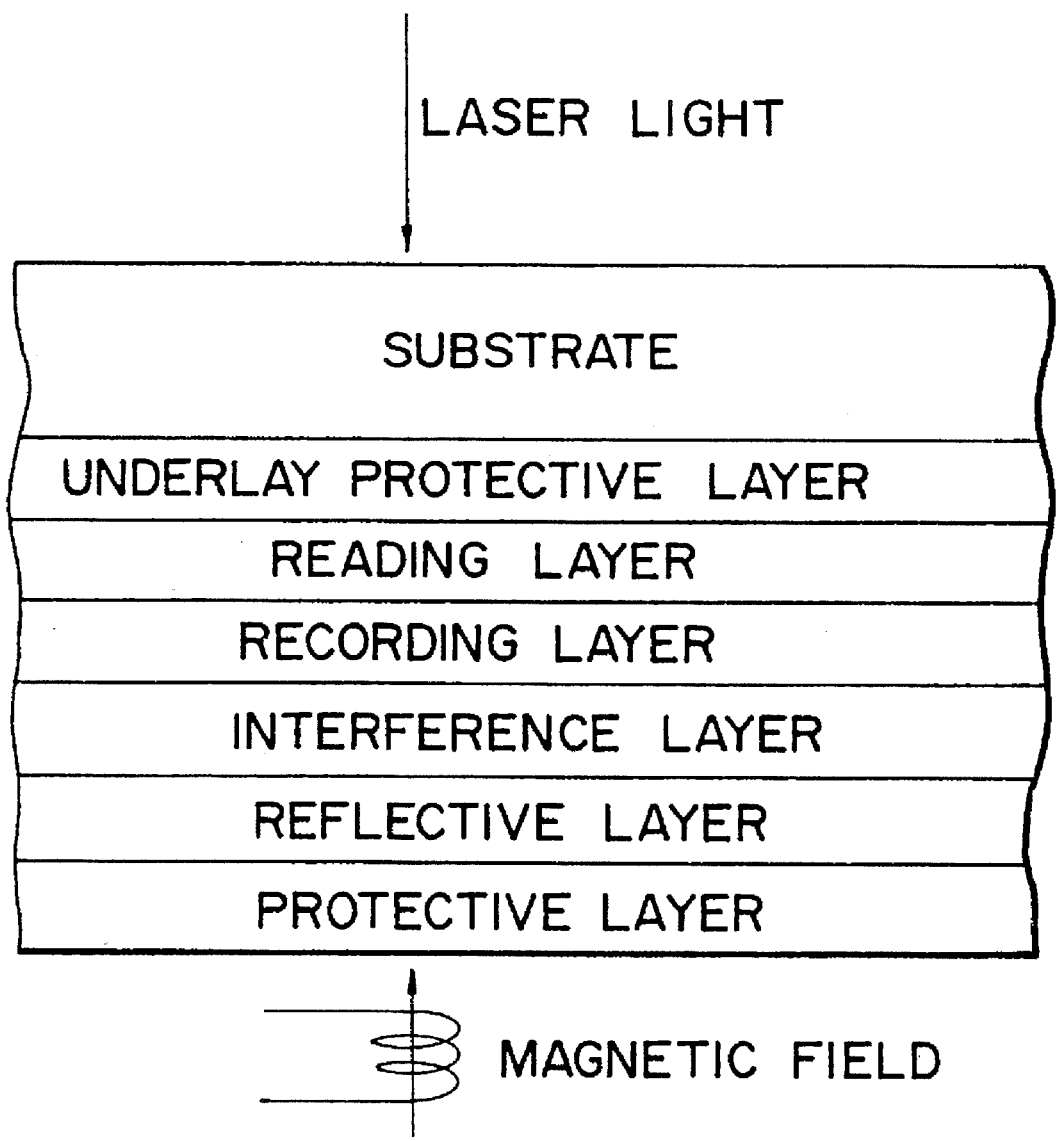
FIG. 31 is a drawing to show the structure of a record medium.

FIG. 31 shows an example of magnetooptical disk used herein. In FIG. 31, a reading layer has a low coercive force and a high Curie temperature at a room temperature, and a reading layer has a higher coercive force and a lower Curie temperature than the reading layer. The two layers are exchange-coupled.

Figure 32:
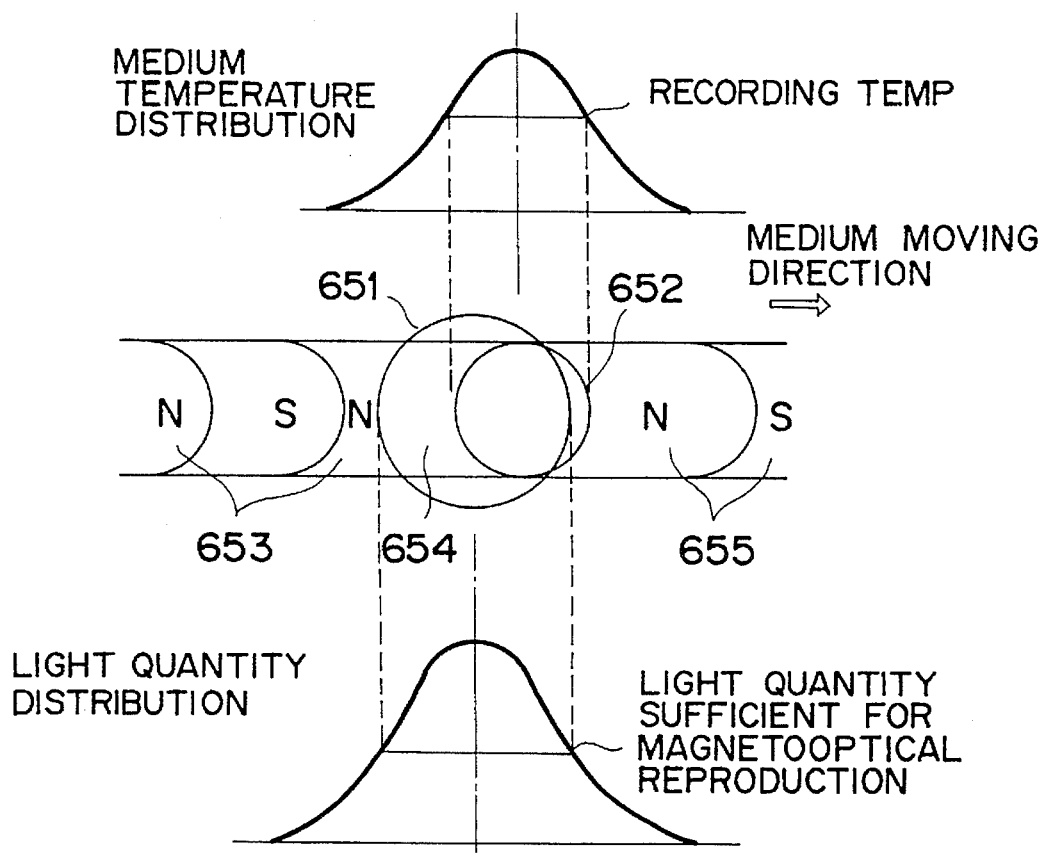
FIG. 32 is a drawing to show a temperature distribution and a light quantity distribution with a light spot on a record medium.

When a modulated magnetic field is applied to the record medium with irradiation of laser beam, the conditions are as shown in FIG. 32. Namely, a distribution of temperature of medium is shifted to the right of a distribution of light quantity due to the medium movement as shown. In FIG. 32, numeral 651 represents a magnetooptical reproduction region, and 652 a recording region about to react to application of magnetic field.

Further, numeral 635 designates information pieces previously recorded, 654 a region about to be erased, and 655 information pieces newly recorded.

Figure 33:
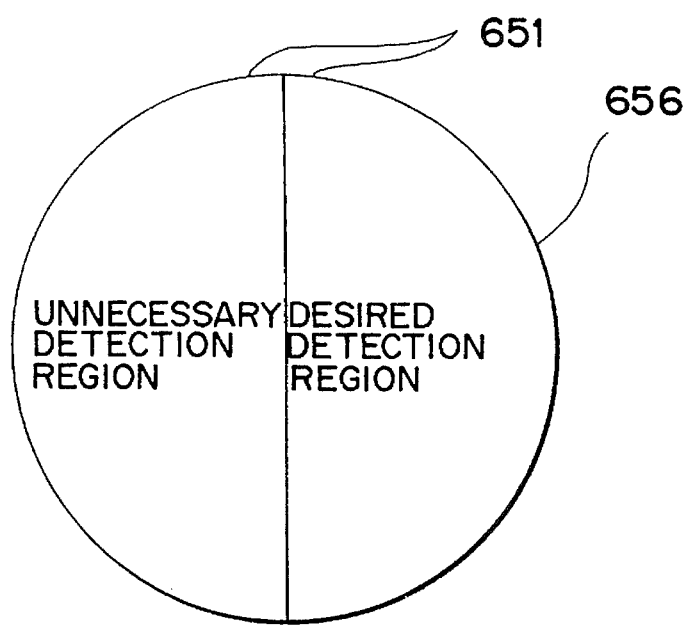
FIG. 33 is a drawing to illustrate regions in a light spot.

If the recording region 652 is a part of the reproduction region 651 as shown and if the recorded information is checked simultaneously with the recording, the signal from region 654 becomes unnecessary. Then considering the spot 651 as divided as shown in FIG. 33, the apparatus of the present invention can extract only a component from the right half region 656 desired to detect.

Although the above embodiment shows an example with the number of optical spot regions of n=2 and the number of sensor segments of m=2, the numbers n and m may be 3 or more.

As described in detail with the drawings, the optical head used in the magnetic field modulation type magnetooptical recording/reproducing apparatus according to the present invention may be constructed in a simple structure, so that the optical head according to the present invention may be readily reduced in size, in weight and in thickness. Further, the present invention can provide an optical head with an excellent and stable direct verification function. The number of components may be also reduced, whereby the production cost of the optical head may be reduced. In addition, the assembly adjustment method may be simplified.

Moreover, according to the present invention, a signal in a smaller region than the optical spot may be read. Namely, the reading resolving power may be improved so as to enable reproduction of information pieces recorded at a high density.

What is claimed is:

1. An optical information reading apparatus comprising:

an optical sensor divided into m segments;

an optical system for reading information recorded on an optical record medium with irradiation of an optical spot divided into n regions, said optical system condensing a reflection light beam from said record medium onto said optical sensor, said optical system characterized by a mapping matrix $\phi$ so that $Q_m = \phi P_n$, wherein components of light quantity reflected from each of the respective n regions are expressed by a vector $P_n = (p_1, p_2, \ldots, p_m)$ and components of light quantities input into said m sensor segments, respectively, are expressed by a vector $Q_m = (q_1, q_2, \ldots, q_m)$; and means for calculating an inverse $\phi^{-1}(Q_m)$ for the vector $Q_m$ of output signals from said sensor segments and for calculating a reflected light quantity from a specific partial region $p_x$ on the optical spot to read information recorded in said region $p_x$.

2. An apparatus according to claim 1, wherein a single optical spot is irradiated on the optical record medium by said optical system.

3. An optical information recording/reproducing apparatus comprising:

an optical sensor divided into m segments;

a first optical system for irradiating an optical information recording medium with a light spot;

modulated magnetic field applying means for applying a magnetic field modulated in accordance with information to the recording medium;

a second optical system for converging a light beam via the recording medium onto said optical sensor, wherein said light spot on the recording medium is divided into n regions so that components of light quantity from the each of the respective n regions are expressed by a vector $P_n = (p_1, p_2, \ldots, P_n$ and components of light quantity input into said m sensor segments are expressed by a vector $Q_m = (q_1, q_2, \ldots, q_m)$, and a mapping matrix $\phi$, defined as a mapping from a vector space $P_n$ to a vector space $Q_m$ so that $Q_m = \phi P_n$, is known;

reading means for calculating an inverse transformation $\phi^{-1}(Q_m)$ for the vector $Q_m$ of output signals from said sensor segments and for calculating a quantity of light via a specific partial region $p_x$ on the recording medium to read information recorded on said region $p_x$; and verifying means for comparing the read out information recorded on said region $p_x$ by said reading means with the information input to said modulated magnetic field applying means.

4. An apparatus according to claim 3, wherein a single optical spot is irradiated on the optical record medium by said first optical system.

\* \* \* \* \*

UNITED STATES PATENT AND TRADEMARK OFFICE
CERTIFICATE OF CORRECTION

PATENT NO. : 5,490,129
DATED : February 6, 1996
INVENTOR(S) : KAZUHIKO MATSUOKA, et al.

It is certified that error appears in the above-indentified patent and that said Letters Patent is hereby corrected as shown below:

IN THE DRAWINGS

Sheet 14

Figure 17, "DETERMING" should read --DETERMINING--.

COLUMN 4

Line 37, "extract" should read --to extract--.

COLUMN 5

Line 19, "paralell" should read --parallel--.

COLUMN 13

Line 28, "distance 6f" should read --distance $\delta f$--.

COLUMN 16

Line 36, "G1 = i-J;" should read --G1 = 1-J;--.
Line 37, "G3 = i-L;" should read --G3 = 1-L--.

UNITED STATES PATENT AND TRADEMARK OFFICE
CERTIFICATE OF CORRECTION

PATENT NO. : 5,490,129

DATED : February 6, 1996

INVENTOR(S) : KAZUHIKO MATSUOKA, et al.

It is certified that error appears in the above-indentified patent and that said Letters Patent is hereby corrected as shown below:

<u>COLUMN 20</u>

Line 39, "$P_n$" should read --$p_n$--.

Signed and Sealed this

Thirteenth Day of August, 1996

*Attest:*

BRUCE LEHMAN

*Attesting Officer*      *Commissioner of Patents and Trademarks*